US012779493B2

(12) United States Patent
Fujii

(10) Patent No.: US 12,779,493 B2
(45) Date of Patent: Nov. 3, 2026

(54) PRODUCTION APPARATUS OF AN ELECTRODE MIXTURE LAYER

(71) Applicant: ZEON CORPORATION, Tokyo (JP)

(72) Inventor: Tsutomu Fujii, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 9 days.

(21) Appl. No.: 18/878,888

(22) PCT Filed: Jul. 24, 2023

(86) PCT No.: PCT/JP2023/027043
§ 371 (c)(1),
(2) Date: Dec. 25, 2024

(87) PCT Pub. No.: WO2024/024738
PCT Pub. Date: Feb. 1, 2024

(65) Prior Publication Data

US 2025/0387799 A1 Dec. 25, 2025

(30) Foreign Application Priority Data

Jul. 29, 2022 (JP) ................................ 2022-122121

(51) Int. Cl.
*B05C 11/02* (2006.01)
*B05C 9/12* (2006.01)
(Continued)

(52) U.S. Cl.
CPC .............. *B05C 11/021* (2013.01); *B05C 9/12* (2013.01); *B05C 11/042* (2013.01); *H01M 4/0404* (2013.01); *H01M 4/043* (2013.01)

(58) Field of Classification Search
CPC ........ B05C 11/021; B05C 9/12; B05C 11/042
See application file for complete search history.

(56) References Cited

U.S. PATENT DOCUMENTS

2017/0179465 A1 6/2017 Torita et al.

FOREIGN PATENT DOCUMENTS

CN 208910973 * 5/2019 ................ A61J 3/06
CN 106233507 * 8/2019 ............. H01M 4/04
(Continued)

OTHER PUBLICATIONS

English Translation of JP 2014-49240.*
(Continued)

*Primary Examiner* — Bret P Chen
(74) *Attorney, Agent, or Firm* — KENJA IP LAW PC

(57) ABSTRACT

A production apparatus of an electrode mixture layer, comprising:

a support unit;

a feeding unit that feeds granulated particles on or above the support unit;

a conveying unit that conveys the granulated particles that have been fed on or above the support unit;

a squeegee unit that levels the conveyed granulated particles to form a granulated particle layer, the squeegee unit including a passage portion, and non-passage portions that are provided at both ends of the passage portion; and a forming unit that applies a load to the granulated particle layer to form an electrode mixture layer, wherein the squeegee unit has a first adjusting mechanism capable of continuously changing a gap in a width direction so that gaps at end portions in the width direction of the passage portion are narrower than a gap at a central portion.

11 Claims, 13 Drawing Sheets

(51) Int. Cl.
*B05C 11/04* (2006.01)
*H01M 4/04* (2006.01)

(56) References Cited

FOREIGN PATENT DOCUMENTS

| | | | | | |
|---|---|---|---|---|---|
| JP | 2007190682 | A | | 8/2007 | |
| JP | 2009184125 | A | | 8/2009 | |
| JP | 2014-49240 | | * | 3/2014 | ............ H01M 4/139 |
| JP | 2015-176842 | | * | 10/2015 | ............ H01M 4/139 |
| JP | 2015176772 | A | | 10/2015 | |
| JP | 2016018682 | A | | 2/2016 | |
| JP | 2016018763 | A | | 2/2016 | |
| JP | 2016022455 | A | | 2/2016 | |
| JP | 2016-71956 | | * | 5/2016 | ............ H01M 4/139 |
| JP | 2016071955 | A | | 5/2016 | |
| JP | 2016100067 | A | | 5/2016 | |
| JP | 2016115569 | A | | 6/2016 | |
| JP | WO2019013218 | | * | 1/2019 | ............ H01M 4/139 |
| JP | 2021068510 | A | | 4/2021 | |
| JP | 6922731 | B2 | | 8/2021 | |
| KR | 10-2020-0028937 | | * | 3/2020 | ............ H01M 4/139 |
| WO | WO 2014/207521 | | * | 12/2014 | .............. H01M 4/62 |
| WO | WO 2019/013218 | | * | 1/2019 | ............ H01M 4/139 |
| WO | WO 2019/013219 | | * | 1/2019 | .............. H01M 4/04 |

OTHER PUBLICATIONS

Phillips, Christopher O., et al., "A Study of the Abrasion of Squeegees Used in Screen Printing and Its Effect on Performance with Application in Printed Electronics". Coatings 2014, 4, 356-379.*
Oliveira, Ana E.F., et al., "Fabrication of Low-cost Screen-printed Electrode in Paper Using Conductive Inks of Graphite and Silver/SilverChloride". Electroanalysis 2023, 35, 2200093, pp. 1-10.*
Feb. 4, 2025, International Preliminary Report on Patentability issued in the International Patent Application No. PCT/JP2023/027043.
Oct. 17, 2023, International Search Report issued in the International Patent Application No. PCT/JP2023/027043.
Jun. 8, 2026, the Extended European Search Report issued by the European Patent Office in the corresponding European Patent Application No. 23846468.9.

* cited by examiner

PRODUCTION APPARATUS OF AN ELECTRODE MIXTURE LAYER

TECHNICAL FIELD

An electrode sheet serving as a component of a battery such as a lithium ion secondary battery may include an electrode mixture layer. The electrode mixture layer is generally formed on a substrate serving as a current collector. As an apparatus for forming an electrode mixture layer, an apparatus has been known in which granulated particles containing an electrode active material are accumulated in a layer shape on a substrate, and a load is applied to the layer of the granulated particles to form the electrode mixture layer (Patent Literatures 1 to 7).

CITATION LIST

Patent Literature

Patent Literature 1: Japanese Patent Application Laid-Open No. 2016-115569 A

Patent Literature 2: Japanese Patent Application Laid-Open No. 2016-018682 A (Corresponding foreign publication: U.S. Patent Application Publication No. 2017/0179465)

Patent Literature 3: Japanese Patent Application Laid-Open No. 2016-100067 A

Patent Literature 4: Japanese Patent Application Laid-Open No. 2016-018763 A

Patent Literature 5: Japanese Patent Application Laid-Open No. 2015-176772 A

Patent Literature 6: Japanese Patent Application Laid-Open No. 2021-068510 A

Patent Literature 7: Japanese Patent No. 6922731 A

SUMMARY OF THE INVENTION

Technical Problem

A production apparatus of an electrode mixture layer includes, for example, a feeding unit that feeds granulated particles; a conveying unit that conveys the fed granulated particles; a squeegee unit that levels the conveyed granulated particles to form a granulated particle layer; and a forming unit that applies a load to the granulated particle layer to form an electrode mixture layer. In order to improve electrode performance, the electrode mixture layer preferably has a high uniformity of a weight proportion of the granulated particles per unit area, that is, a high uniformity of a basis weight. However, in the production apparatus having the aforementioned configuration, the basis weight at each end portion in the width direction of the granulated particle layer may become high, and thus a load is concentrated at the end portions in the width direction of the granulated particle layer in the forming unit. As a result, an electrode sheet may be likely to be distorted, and, due to this, a failure may occur in a production process of an electrode sheet.

When an electrode mixture layer in which the basis weight of the granulated particles is uneven is used for a battery, a charge and discharge reaction on an electrode surface may be ununiformed to reduce cycle characteristics and storage characteristics in a high charge state. From the viewpoint of battery safety, it is desirable that the uniformity of the charge and discharge reaction on the electrode surface be high.

The present invention has been made in view of the above-mentioned problems, and an object of the present invention is to provide a production apparatus of an electrode mixture layer that can produce an electrode mixture layer in which an excess basis weight of granulated particles at each end portion in the width direction of the electrode mixture layer is suppressed during producing the electrode mixture layer and the uniformity of the basis weight of the granulated particles is favorable, and a production method of an electrode mixture layer using this apparatus.

Solution to Problem

The aforementioned problems are solved by the invention exemplified as follows.

<1> A production apparatus of an electrode mixture layer, comprising:

- a support unit;
- a feeding unit that feeds granulated particles on or above the support unit, the granulated particles containing an active material and a binder;
- a conveying unit that conveys the granulated particles that have been fed on or above the support unit;
- a squeegee unit that levels the conveyed granulated particles to form a granulated particle layer, the squeegee unit including a passage portion that is provided so as to have a gap relative to the support unit and allows the granulated particles to pass therethrough, and non-passage portions that are provided at both ends of the passage portion and block the passage of the granulated particles; and
- a forming unit that applies a load to the granulated particle layer to form an electrode mixture layer, wherein;

- the squeegee unit has a first adjusting mechanism capable of continuously changing a gap in a width direction so that gaps at end portions in the width direction of the passage portion are narrower than a gap at a central portion.

<2> The production apparatus of an electrode mixture layer according to <1>, comprising a pre-forming unit disposed between the squeegee unit and the forming unit, wherein:

- the pre-forming unit includes a main body unit that compresses the granulated particle layer such that an apparent density of the granulated particle layer is equal to or higher than an apparent density of the granulated particle layer leveled by the squeegee unit and equal to or lower than an apparent density of the electrode mixture layer formed by the forming unit;
- the main body unit of the pre-forming unit is arranged with a gap that allows the granulated particle layer to be compressed; and
- the pre-forming unit includes a pair of width regulating jigs that are disposed at both ends of the main body unit and that regulates a width of the granulated particle layer.

<3> The production apparatus of an electrode mixture layer according to <2>, wherein a width between the paired width regulating jigs is wider than a width of the passage portion of the squeegee unit.

<4> The production apparatus of an electrode mixture layer according to <1>, comprising a pre-forming unit disposed between the squeegee unit and the forming unit, wherein:

- the pre-forming unit includes a main body unit that compresses the granulated particle layer such that an apparent density of the granulated particle layer is equal to or higher than an apparent density of the granulated particle layer leveled by the squeegee unit and equal to or lower than an apparent density of the electrode mixture layer formed by the forming unit;

the main body unit of the pre-forming unit is arranged with a gap that allows the granulated particle layer to be compressed; and the main body unit of the pre-forming unit includes a second adjusting mechanism capable of continuously changing gaps in the width direction of the pre-forming unit so that gaps at end portions in the width direction thereof are narrower than a gap at a central portion.

<5> The production apparatus of an electrode mixture layer according to <1>, comprising a pre-forming unit disposed between the squeegee unit and the forming unit, wherein:

the pre-forming unit includes a main body unit that compresses the granulated particle layer such that an apparent density of the granulated particle layer is equal to or higher than an apparent density of the granulated particle layer leveled by the squeegee unit and equal to or lower than an apparent density of the electrode mixture layer formed by the forming unit;

the main body unit of the pre-forming unit is arranged with a gap that allows the granulated particle layer to be compressed, and the main body unit of the pre-forming unit includes a second adjusting mechanism capable of continuously changing gaps in the width direction of the pre-forming unit so that gaps at end portions in the width direction thereof are narrower than a gap at a central portion; and the pre-forming unit includes a pair of width regulating jigs that are disposed at both ends of the main body unit and that regulates the width of the granulated particle layer.

<6> The production apparatus of an electrode mixture layer according to <5>, wherein a width between the paired width regulating jigs is wider than a width of the passage portion of the squeegee unit.

<7> The production apparatus of an electrode mixture layer according to any one of <4> to <6>, wherein the main body unit including the second adjusting mechanism is a roll having a reverse crown roll shape.

<8> The production apparatus of an electrode mixture layer according to any one of <1> to <7>, wherein the first adjusting mechanism includes an adjusting mechanism (A) that has a blade shape and can optionally adjust a continuous change in the gap in the width direction of the passage portion.

<9> The production apparatus of an electrode mixture layer according to <8>, wherein the adjusting mechanism (A) is one or more types selected from the group consisting of a push-pull bolt and a heat bolt.

<10> The production apparatus of an electrode mixture layer according to any one of <1> to <9>, comprising a basis weight inspecting unit that inspects a basis weight in the width direction of at least one of the granulated particle layer and the electrode mixture layer.

<11> The production apparatus of an electrode mixture layer according to any one of <1> to <10>, comprising an appearance inspecting unit that inspects an appearance of the granulated particle layer.

<12> A production method of an electrode mixture layer that uses the production apparatus of an electrode mixture layer according to any one of <1> to <11>, the production method comprising the steps of:

conveying the granulated particles, which have been fed from the feeding unit onto or above the support unit, by the conveying unit and leveling the conveyed granulated particles using the squeegee unit to form a granulated particle layer; and applying a load to the granulated particle layer using the forming unit to form the electrode mixture layer.

<13> A production method of an electrode mixture layer that uses the production apparatus of an electrode mixture layer according to <10>, the production method comprising the steps of:

conveying the granulated particles, which have been fed from the feeding unit onto or above the support unit, by the conveying unit and leveling the conveyed granulated particles using the squeegee unit to form a granulated particle layer;

applying a load to the granulated particle layer using the forming unit to form the electrode mixture layer; and inspecting a basis weight in the width direction of at least one of the granulated particle layer and the electrode mixture layer using the basis weight inspecting unit, and, when a portion where the basis weight in the width direction falls outside the management value is detected, adjusting the gap in the width direction of the squeegee unit corresponding to the portion.

<14> A production method of an electrode mixture layer that uses the production apparatus of an electrode mixture layer according to <11>, the production method comprising the steps of:

conveying the granulated particles, which have been fed from the feeding unit onto or above the support unit, by the conveying unit and leveling the conveyed granulated particles using the squeegee unit to form a granulated particle layer;

inspecting an appearance of the granulated particle layer using the appearance inspection unit, and when a portion where a linear defect occurs in the granulated particle layer is detected, temporarily widening the gap in the width direction of the squeegee unit corresponding to the portion to eliminate the linear defect; and applying a load to the granulated particle layer using the forming unit to form the electrode mixture layer.

Advantageous Effects of Invention

According to the present invention, it is possible to provide a production apparatus of an electrode mixture layer that can produce an electrode mixture layer in which an excess basis weight of granulated particles at each end portion in the width direction of the electrode mixture layer is suppressed during producing the electrode mixture layer and the uniformity of the basis weight of the granulated particles is favorable, and a production method of an electrode mixture layer using this apparatus.

DESCRIPTION OF EMBODIMENTS

Figure 1:
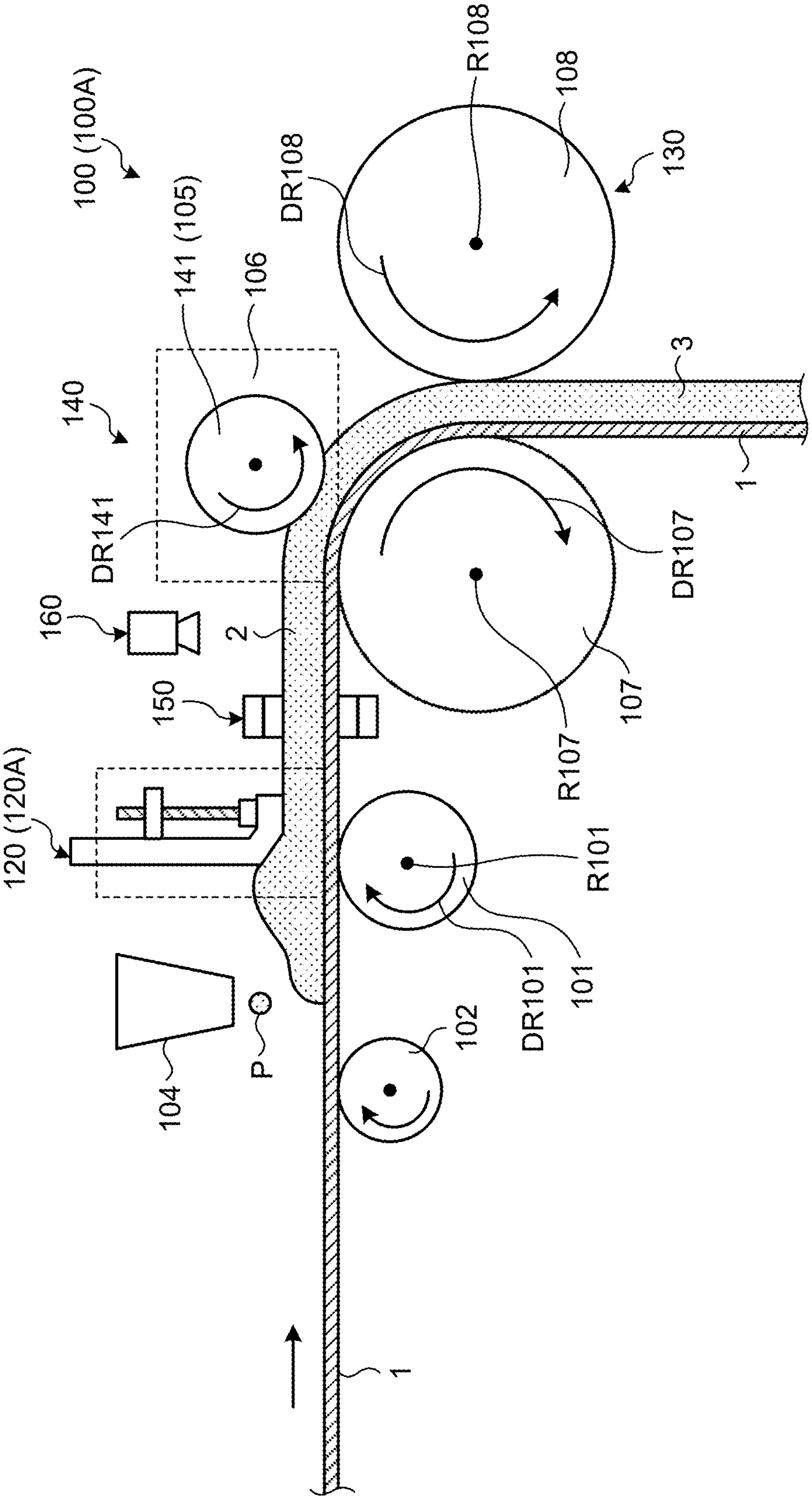
FIG. 1 is a schematic view illustrating an example of a production apparatus of an electrode mixture layer according to a first embodiment.

Hereinafter, the present invention will be described in detail with reference to embodiments and examples. However, the present invention is not limited to embodiments and examples described below, and may be freely modified for implementation without departing from the scope of claims of the present invention and the scope of their equivalents. Components of embodiments described below may be combined as appropriate. In the drawings, the same components are denoted by the same reference numerals, and descriptions thereof may be omitted.

In the following description, a "long-length" substrate refers to a substrate with the length that is 5 times or more the width of the substrate, and preferably a substrate with the length that is 10 times or more the width thereof, and specifically refers to a substrate having a length that allows the substrate to be wound up into a rolled shape for storage or transportation. The upper limit of the length of the substrate relative to the width of the substrate may be, but not particularly limited to, for example, 100,000 times or less the width.

In the following description, a direction of an element being "parallel", "perpendicular" or "orthogonal" may allow an error within the range of not impairing the advantageous effects of the present invention, for example, within a range of +3°, +2°, or +1° unless otherwise specified.

In the following description, the expression "on or above an element" includes being in direct contact with the element and being indirectly disposed on the element.

In the following description, the terms "upstream" and "downstream" represent the upstream and downstream, respectively, of the flowing direction of granulated particles, a granulated particle layer, or an electrode mixture layer.

An electrode mixture layer produced with a production apparatus according to an embodiment of the present invention is obtained by applying a load to a granulated particle layer. The electrode mixture layer is preferably formed on a substrate. The substrate is preferably long-length.

Examples of the substrate may include a metal foil formed from aluminum, platinum, nickel, tantalum, titanium, stainless steel, copper, and other alloys; a film containing an electroconductive material (for example, carbon, electroconductive macromolecule); paper; cloths formed from natural fibers, synthetic fibers, and the like; and a resin film containing a polymer. Examples of a polymer that may be contained in a resin film may include a polyester such as polyethylene terephthalate and polyethylene naphthalate; a polyimide; a polypropylene; a polyphenylene sulfide; a polyvinyl chloride; an aramid; PEN; and PEEK. They may be appropriately selected according to a purpose.

Among these, the substrate is preferably a metal foil, a film containing a carbon material, or a film containing an electroconductive macromolecular material, and more preferably a metal film. From the viewpoint of electroconductivity and voltage resistance, a copper foil, an aluminum foil, and an aluminum alloy foil are further preferable. These substrates are suitable for producing an electrode sheet of a lithium ion battery.

The substrate may undergo surface treatments such as film coating, boring, buffing, sandblasting, and etching, and may be subjected to multiple types of surface treatments.

The thickness of the substrate is not particularly limited, and is preferably 1 μm or more, and more preferably 5 μm or more, and is preferably 1,000 μm or less, and more preferably 800 μm or less. The substrate may have an optional width.

Granulated particles generally contain an electrode active material and a binder, and as necessary, may contain an optional component such as a dispersant, an electroconductive material, or an additive.

The electrode active material contained in the granulated particles may be a positive electrode active material or a negative electrode active material. Examples of the positive electrode active material and the negative electrode active material may include materials that may be used as an electrode active material of a lithium ion battery. Examples of the positive electrode active material may include a metal oxide capable of being reversibly doped or dedoped with a lithium ion. Examples of the metal oxides may include lithium cobaltate ($LiCoO_2$), lithium nickelate ($LiNiO_2$), lithium manganate ($LiMn_2O_4$), lithium iron phosphate ($LifePO_4$), and ternary active materials in which part of lithium cobaltate is replaced by nickel and manganese (for example, $LiCo_{1/3}Ni_{1/3}Mn_{1/3}O_2$). As the positive electrode active material, one type thereof may be solely used, and a plurality of types thereof may also be used in combination.

Examples of the negative electrode active material may include low-crystallizable carbon (amorphous carbon) (for example, easily graphitizable carbon, non-graphitizable carbon, and pyrolyzed carbon); graphite (for example, natural graphite and artificial graphite); an alloy-based material containing tin, silicon, and the like; and an oxide (for example, silicon oxide, tin oxide, and lithium titanate). As the negative electrode active material, one type thereof may be solely used, and a plurality of types thereof may also be used in combination.

The shape of the electrode active material is preferably granular. When the particles have a granular shape, an electrode having a high density may be obtained by forming the electrode active material.

The volume-average particle diameter (D50) of the electrode active material is preferably 0.1 μm or more and 100 μm or less, more preferably 0.3 μm or more and 50 μm or less, and further preferably 0.5 μm or more and 30 μm or less. When the volume-average particle diameter (D50) of the electrode active material falls within the aforementioned range, the electrode active material may be suitably used as a material for an electrode of a lithium ion battery.

The binder contained in the granulated particles is preferably a compound capable of binding the aforementioned electrode active materials to one another. The binder is more preferably a dispersion type binder having a dispersing property in a solvent. Examples of the dispersion type binder may include a macromolecular compound such as a silicon atom-containing polymer, a fluorine atom-containing polymer, a conjugated diene-based polymer, an acrylate-based polymer, polyimide, polyamide, and polyurethane.

The shape of the dispersion type binder is not particularly limited, but is preferably granular. With the dispersion type binder that is granular, the binding property is improved, and a reduction in capacity of a produced electrode and deterioration of the electrode due to repeated charge and discharge may be suppressed. Examples of the granular binder may include an aqueous dispersion of binder particles, such as latex, and a granular binder that is obtained by drying such an aqueous dispersion.

From the viewpoint of sufficiently securing adhesion between the obtained electrode mixture layer and the substrate and reducing internal resistance, the amount of the binder on a dry weight basis is preferably 0.1 part by weight or more and 50 parts by weight or less, more preferably 0.5 part by weight or more and 20 parts by weight or less, and further preferably 1 part by weight or more and 15 parts by weight or less, relative to 100 parts by weight of the electrode active material.

The granulated particles may contain a dispersant as an optional component. Examples of the dispersant may include a cellulosic polymer such as carboxymethylcellulose and methylcellulose, and an ammonium salt or an alkali metal salt thereof. As the dispersant, one type thereof may be solely used, and a plurality of types thereof may also be used in combination.

The granulated particles may contain an electroconductive material as an optional component. Examples of the electroconductive material may include electroconductive carbon black such as furnace black, acetylene black, and ketjen black (registered trademark of Akzo Nobel Chemicals B.V.). Acetylene black and ketjen black are preferable. In addition, vapor-phase growth carbon fibers such as VGCF (registered trademark) or carbon nanotube; a graphite-based carbon material such as expanded graphite or graphite, graphene, or the like may be used as an electroconductive material. As the electroconductive material, one type thereof may be solely used, and a plurality of types thereof may also be used in combination.

The granulated particles may be produced by granulating the electrode active material and the binder, as well as the optional component that may be contained if necessary. Examples of a method for producing the granulated particles may include, but not particularly limited to, publicly known granulation methods such as a fluidized bed granulation method, a spray drying granulation method, and a rolling bed granulation method.

Each of the granulated particles preferably has a form of secondary particles that are formed by aggregating a plurality of primary particles.

Specifically, secondary particles formed by binding a plurality of (preferably several to several tens) particles of the electrode active material and the optional component through the binder are preferable.

From the viewpoint of easily obtaining an electrode mixture layer having a desired thickness, the volume-average particle diameter (D50) of the granulated particles is preferably 0.1 μm or more, more preferably 1 μm or more, further preferably 20 μm or more, and still more preferably 30 μm or more, and is preferably 1,000 μm or less, more preferably 500 μm or less, and further preferably 250 μm or less.

The volume-average particle diameter (D50) of the granulated particles is a 50% volume-average particle diameter measured in a dry manner and calculated using a laser scattering and diffraction-based particle size distribution measurement device (e.g., Microtrac MT3300EX II; manufactured by MicrotracBEL Corp.). The 50% volume-average particle diameter is the particle diameter at a point where the cumulative frequency accumulated from the smaller diameter side on the obtained particle size distribution (volume basis) reaches 50%.

1. Outline of Production Apparatus for Electrode Mixture Layer

A production apparatus of an electrode mixture layer according to an embodiment of the present invention includes: a support unit; a feeding unit that feeds granulated particles on or above the support unit, the granulated particles containing an active material and a binder; a conveying unit that conveys the granulated particles that have been fed on or above the support unit; a squeegee unit that levels the conveyed granulated particles to form a granulated particle layer, the squeegee unit including a passage portion that is provided so as to have a gap relative to the support unit and allows the granulated particles to pass therethrough, and non-passage portions that are provided at both ends of the passage portion and block the passage of the granulated particles; and a forming unit that applies a load to the granulated particle layer to form an electrode mixture layer. The squeegee unit has a first adjusting mechanism capable of continuously changing a gap in the width direction so that the gaps at the end portions in the width direction of the passage portion are smaller than the gap at the central portion.

According to the present invention, by the squeegee unit provided, an excess basis weight of the granulated particles at each end portion in the width direction of the electrode mixture layer can be suppressed, and an electrode mixture layer having satisfactory uniformity of basis weight of the granulated particles can be produced.

Figure 15:
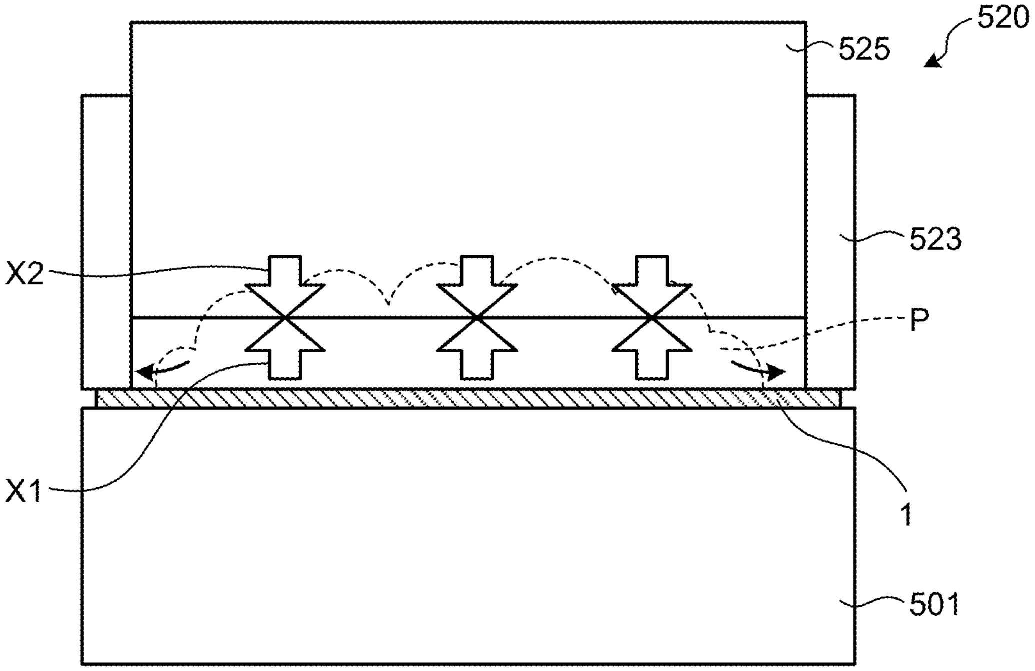
FIG. 15 is a front view illustrating an example of a squeegee unit used in a conventional production apparatus of an electrode mixture layer.
Figure 16:
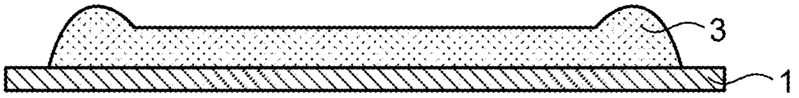
FIG. 16 is a cross-sectional view schematically illustrating an electrode mixture layer with uneven granulated particle basis weight.

As illustrated in FIG. 15, in the production apparatus of an electrode mixture layer, a squeegee unit 520 that is conventionally used is generally provided so that the gap relative to the main surface of a substrate 1 has a constant distance regardless of the end portions and the central portion. When an electrode mixture layer is produced using a production apparatus including such a squeegee unit, the basis weight of granulated particles at each end portion in the width direction of an electrode mixture layer 3 may be larger than the basis weight of the granulated particles at the central portion as illustrated in FIG. 16. In the production apparatus of an electrode mixture layer, width regulating jigs for regulating the width of the electrode mixture layer, such as stock guides 523, may be disposed at both ends of the squeegee unit 520 in order to provide the non-passage portions in some cases. However, the inventor of the present invention has found that although there is a difference in degree depending on the presence or absence of the width regulating jigs, the basis weight of the granulated particles at each end portion tends to be large regardless of the presence or absence of the width regulating jigs.

The inventor presumes that a mechanism that increases the basis weight of the granulated particles at each end portion in the width direction of the electrode mixture layer and a mechanism that can suppress the unevenness of the basis weight in the present invention are as described below. However, the technical scope of the present invention is not restricted by the mechanisms described below.

When the conventional squeegee unit 520 is used as illustrated in FIG. 15, the granulated particles P exert a force X1 that presses the squeegee unit 520 upward during the passage of the granulated particles P through the gap of the squeegee unit 520, and the granulated particles P flow in both width directions by a load caused by a reaction force X2 thereof. Therefore, the inventor presumes that the basis weight at the end portions of the granulated particle layer is increased. Furthermore, when the squeegee unit includes the width regulating jigs, the movement of the granulated particles disposed around the width regulating jigs is restricted by the width regulating jigs, and the granulated particles are likely to remain at the end portions. Accordingly, the inventor considers that the basis weight at the end portions is further increased.

On the other hand, according to the present invention, the squeegee unit has a first adjusting mechanism capable of continuously changing a gap in the width direction so that the gaps at the end portions in the width direction of the passage portion are narrower than the gap at the central portion, and therefore the granulated particles may disperse a force that presses a squeegee device upward. Thus, the flowing of the granulated particles in both width directions by a load caused by the reaction force can be suppressed.

The production apparatus of an electrode mixture layer according to an embodiment of the present invention includes at least a support unit, a feeding unit, a conveying unit, a squeegee unit, and a forming unit. The production apparatus may include, as optional components, a pre-forming unit, a basis weight inspecting unit, and an appearance inspecting unit. Such a production apparatus will be described below with more concrete embodiments, but the present invention is not limited to the following concrete embodiments.

For example, the production apparatus may include second and third conveying units that convey a substrate depending on the form of the apparatus. Hereinafter, in order to distinguish the second and third conveying units from the conveying unit that conveys granulated particles, the conveying unit that conveys granulated particles may be referred to, and be described, as a first conveying unit.

2. First Embodiment

Figure 2:
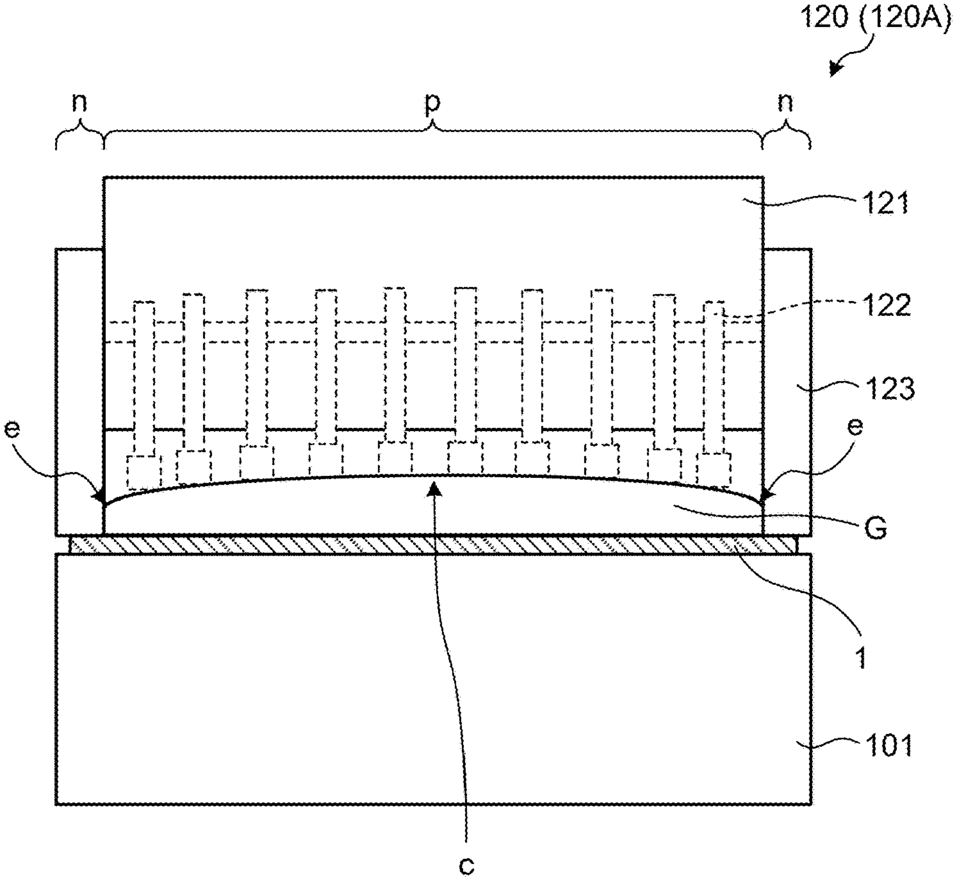
FIG. 2 is a front view schematically illustrating a squeegee unit used in the production apparatus of FIG. 1.
Figure 3:
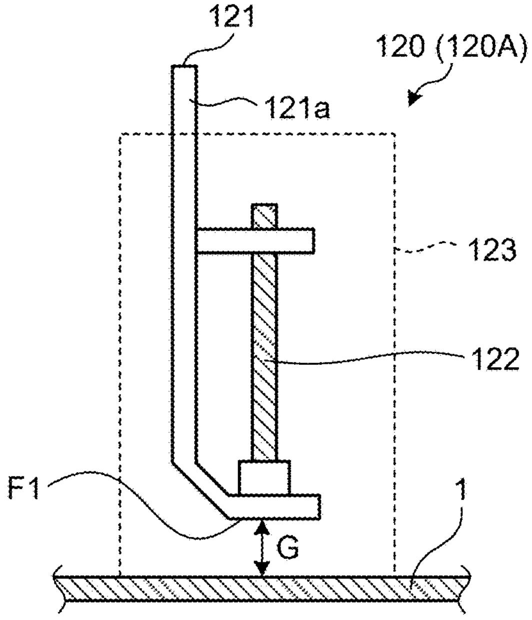
FIG. 3 is a side view schematically illustrating the squeegee unit used in the production apparatus illustrated in FIG. 1.

FIG. 1 is a schematic view illustrating an example of a production apparatus of an electrode mixture layer according to a first embodiment. FIG. 2 is a front view schematically illustrating a squeegee unit used in the production apparatus of FIG. 1. FIG. 3 is a side view schematically illustrating a squeegee unit used in the production apparatus illustrated in FIG. 1. FIG. 4 to FIG. 8 are schematic diagrams for explaining the continuous change in a gap in the width direction of a passage portion of the squeegee unit.

As illustrated in FIG. 1, a production apparatus 100 (100A) of an electrode mixture layer according to the first embodiment includes a second conveying unit 102, a feeding unit 104, a support roll 101, a squeegee unit 120 (120A), a basis weight inspecting unit 150, an appearance inspecting unit 160, a pre-forming unit 140, and a forming unit 130. The support roll 101 functions as a support unit and a first conveying unit.

The support roll 101 is a columnar member, and is supported so as to be rotatable in a direction DR101 about an axis R101. The second conveying unit 102 conveys the substrate 1 to the support roll 101, which serves as the support unit and the first conveying roll, and the support roll 101 conveys the substrate 1 downstream while rotating in the direction DR101. The second conveying unit 102 is, for example, a conveying roll. As the material of the surface of the support roll and the conveying roll, for example, the same material as the material of the surface of the forming roll described later can be used.

The feeding unit 104 feeds granulated particles P onto a main surface of the substrate 1 supported by the support roll 101 above the support roll 101. An optional powder feeding device may be used as the feeding unit 104. Examples of the powder feeding mechanism may include a pressure-feeding type, a rotary vane type, a screw type, and a rotary drum type.

The feeding unit 104 includes a hopper unit having a granulated particle inlet and a granulated particle outlet. The granulated particles P are loaded from the granulated particle inlet. The granulated particles P are fed through the granulated particle outlet onto the main surface of the substrate 1 supported by the support roll 101. That is, the surface to which the granulated particles P are fed is the main surface of the substrate 1.

The support roll 101 serving as the first conveying unit rotates in the direction DR101 to thereby convey the granulated particles P, which have been fed onto the main surface of the substrate 1, downstream together with the substrate 1.

The squeegee unit 120 is a member for forming the granulated particle layer 2 by leveling the granulated particles P conveyed by the support roll 101. In FIG. 1, a squeegee unit 120A having a blade shape is used as the squeegee unit 120.

As illustrated in FIGS. 2 and 3, the squeegee unit 120A includes a passage portion p that is provided so as to have a gap G relative to the support roll 101 and that allows the granulated particles to pass therethrough, and non-passage portions n that are provided at both ends of the passage portion p and that block the passage of the granulated particles.

In the squeegee unit 120A, a first adjusting mechanism 121 is provided in the passage portion p, and stock guides 123 as width regulating jigs are provided in the non-passage portions n.

The first adjusting mechanism 121 has a structure in which the gap G in the width direction can be continuously changed so that the gaps at the end portions e in the width direction of the passage portion p are narrower than the gap at the central portion c.

The first adjusting mechanism 121 has a first surface F1 that faces the circumferential surface of the support roll 101 as the support unit with the substrate 1 interposed therebetween. The circumferential surface of the support roll 101 is generally flat in the width direction of the squeegee unit, and has no height difference that affects the dimension of the gap. On the other hand, the first surface F1 of the first adjusting mechanism 121 has a height difference such that the gaps at the end portions e in the width direction of the passage portion p are relatively narrow and the gap at the central portion c is relatively wide. In other words, the first surface F1 has a height difference in which the end portions e are relatively high with the central portion c serving as a reference. Therefore, the first adjusting mechanism 121 has a structure in which the height differences between the central portion c and each end portion e of the first surface F1 are continuously changed. The height at each end portion e, with the central portion c as a reference, refers to a distance in the height direction of the end portion when viewed in the direction (downward direction) toward the support unit, with the central portion c serving as a reference. In the following description, the same applies to the height of the end portion with the central portion serving as a reference.

In the squeegee unit, the central portion in the width direction of the passage portion refers to a portion that is substantially equidistant from both end portions in the width direction of the passage portion. The phrase "substantially equidistant from both end portions in the width direction of the passage portion" means to include not only a case where a distance d1 from one end portion and a distance d2 from the other end portion are exactly the same (d1=d2), but also a case where the absolute value of the difference between the distances d1 and d2 has an error of about ±3% with respect to the distance in the width direction.

Figure 17:
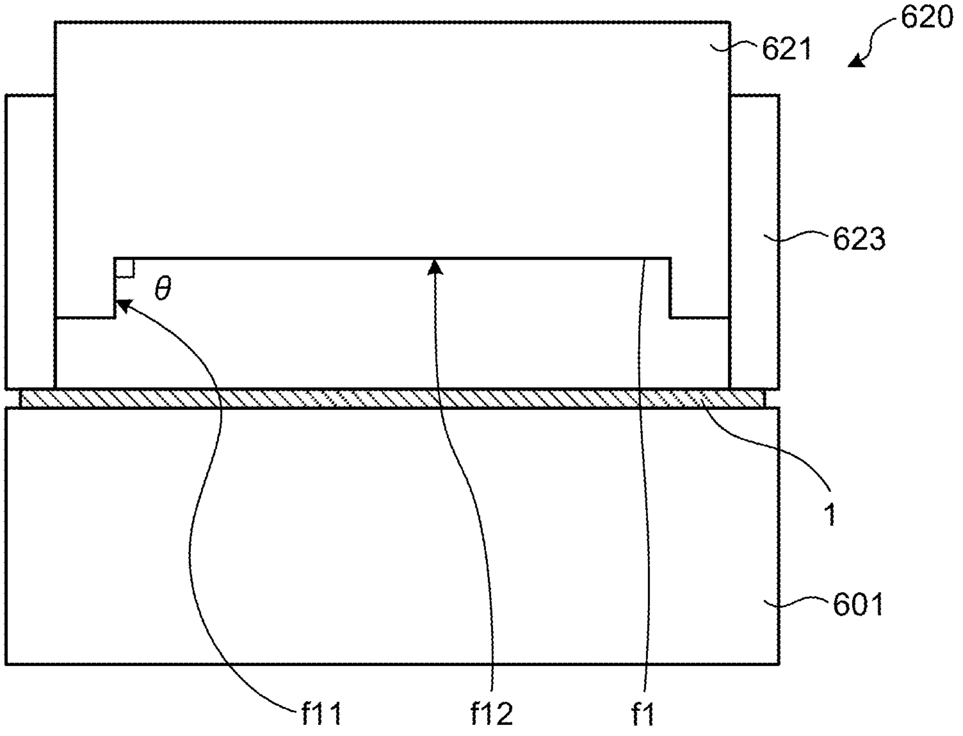
FIG. 17 is a schematic front view for explaining an example of a "step that blocks granulated particles" in the squeegee unit.

The term "continuous change" refers to a change in the width direction of the passage portion that does not have a step that prevents the flow of the granulated particles. The "step that prevents granulated particles" refers to a step by which the flow of the granulated particles is prevented in the contact portion of the squeegee unit with the granulated particles, thereby causing a portion in which the basis weight of the granulated particles in the width direction locally increases. Such a step may refer to a case where, for example, as illustrated in FIG. 17, in a blade-shaped squeegee unit 620 of which a first surface f1 facing a support roll 601 via the substrate 1 has at least two adjacent surfaces f11 and f12, an angle θ formed by the surfaces f11 and f12 can be less than 135°. The angle θ formed by the surfaces f11 and f12 refers to a smaller angle among the two angles formed by the surfaces f11 and f12.

Figure 4:
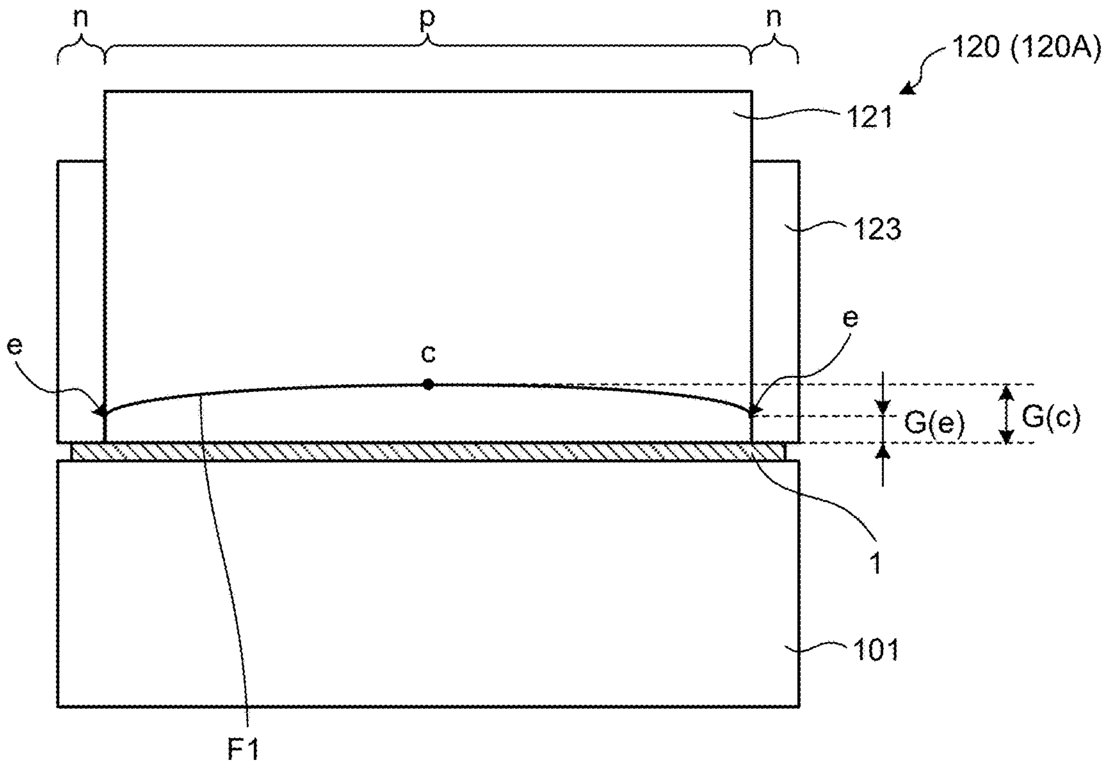
FIG. 4 is a schematic view for explaining a continuous change in a gap in a width direction of a passage portion of the squeegee unit.

A specific shape of the first surface F1 of the first adjusting mechanism 121 may be a shape including a curved surface. When the first surface F1 includes a curved surface, for example, as illustrated in FIG. 4, the first surface F1 may be shaped so that the height of the surface increases in an arc shape from the central portion c to each end portion e. In this case, the first adjusting mechanism 121 can narrow the gap in the width direction of the passage portion p in an arc shape from the gap G(c) at the central portion to the gaps G(e) at the end portions.

Figure 5:
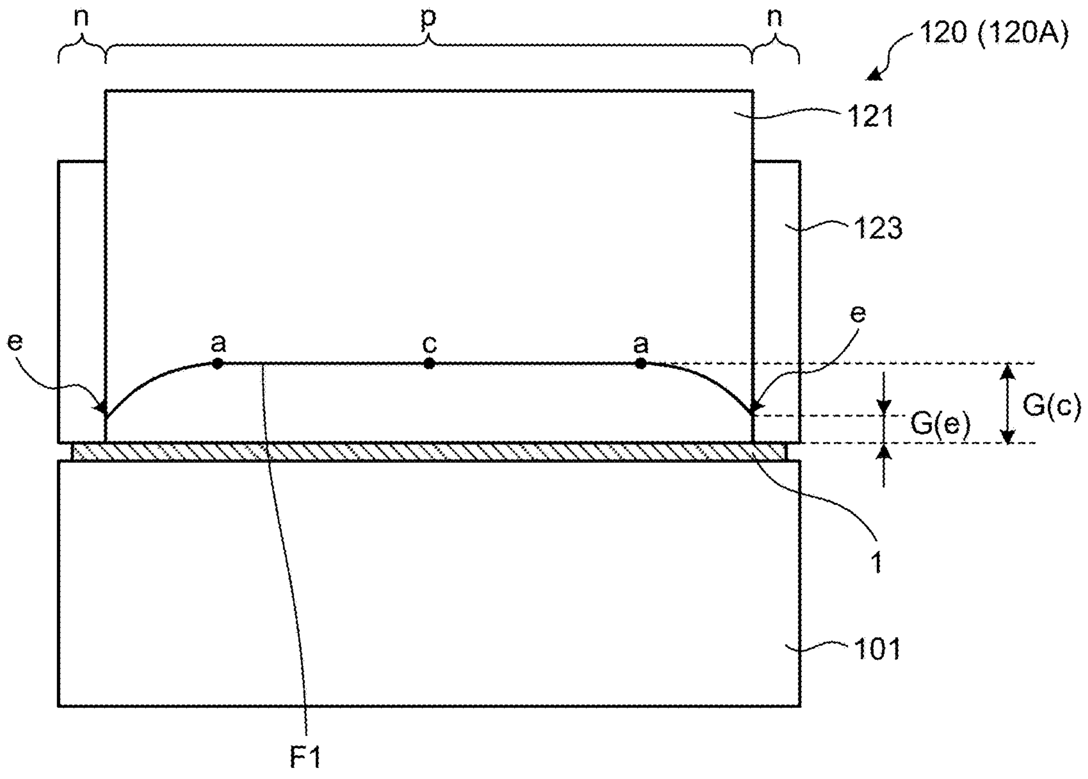
FIG. 5 is a schematic view for explaining a continuous change in the gap in the width direction of the passage portion of the squeegee unit.

In addition, when the first surface F1 includes a curved surface, it may further include a flat surface that is parallel to the support roll (support unit). In this case, for example, as illustrated in FIG. 5, the first surface F1 can have a shape that is composed of a flat surface including a central portion c and parallel to the support roll 101 from the central portion c to an optional position a between the central portion c and each end portion e, and that increases to be in an arc shape from the position a to each end portion e. In this case, the first adjusting mechanism 121 can form the gap in the width direction of the passage portion p so that the gap G(c) up to the position a, including the central portion c, is constant while the gap from the position a, where the gap G(c) is located, to the end portion e, where the gap G(e) is located, gradually narrows in an arc shape.

Furthermore, when the shape of the first surface includes a curve, although not illustrated, the first surface may have irregularities formed by curved surfaces.

Furthermore, a specific shape of the first surface of the first adjusting mechanism may be a shape including at least two adjacent flat surfaces. In this case, the angle Θ formed by the two adjacent flat surfaces may be, for example, 135° or more and 180° or less. The angle Θ formed by the two adjacent flat surfaces refers to the smaller angle among the two angles formed by the two flat surfaces, and refers to an angle measured on a side which becomes the interface in contact with the granulated particles.

Figure 6:
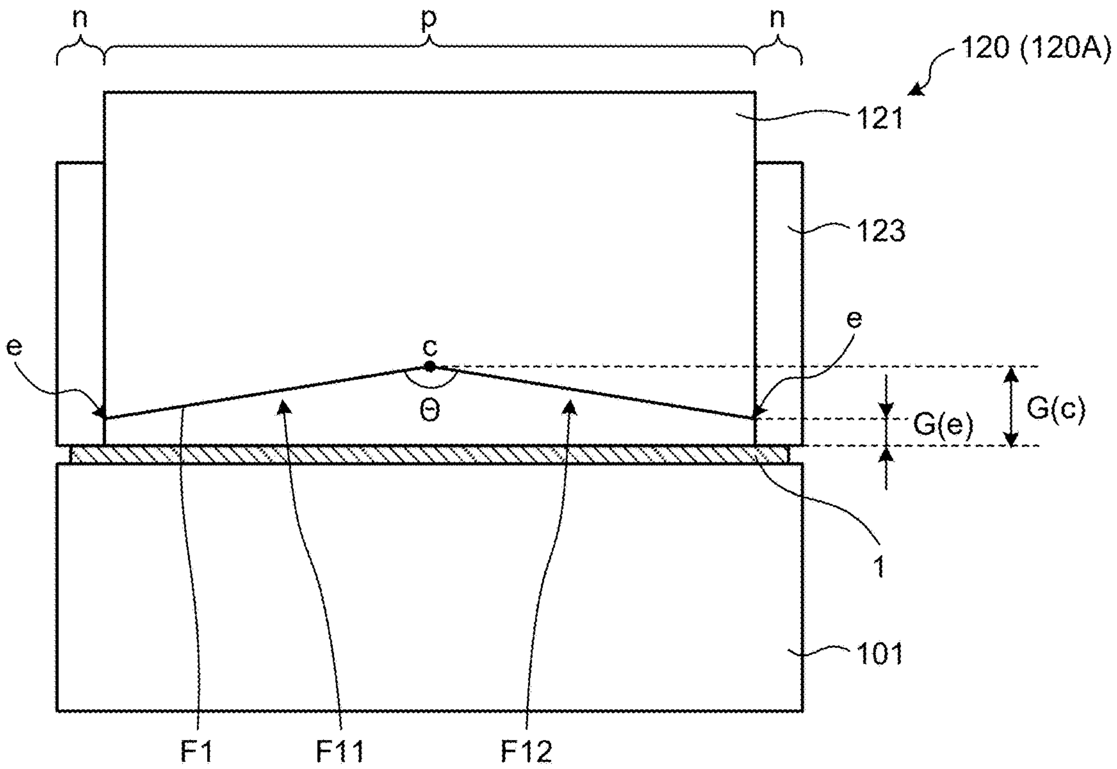
FIG. 6 is a schematic view for explaining a continuous change in the gap in the width direction of the passage portion of the squeegee unit.

If the shape of the first surface includes at least two adjacent flat surfaces, for example, as illustrated in FIG. 6, the first surface F1 may include two adjacent flat surfaces F11 and F12. In this case, the first surface F1 may have a shape in which the height of the surface increases linearly from the central portion c to each end portion e. In addition, the angle Θ formed by the flat surfaces F11 and F12 falls within the numerical range described above. In this case, the first adjusting mechanism 121 can make the gap in the width direction of the passage portion p narrow linearly from the gap G(c) at the central portion to the gap G(e) at each end portion.

Figure 7:
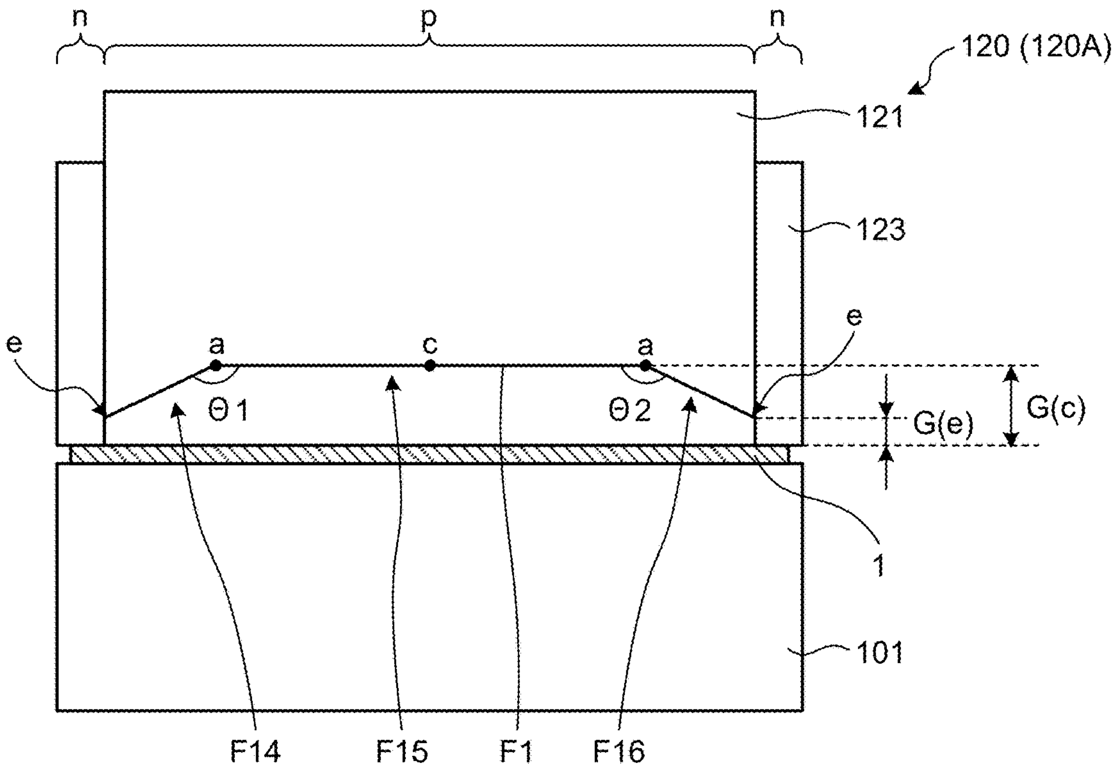
FIG. 7 is a schematic view for explaining a continuous change in the gap in the width direction of the passage portion of the squeegee unit.

When the first surface includes at least two adjacent flat surfaces, the first surface may further include a flat surface parallel to the support unit in addition to the two adjacent flat surfaces. In this case, for example, as illustrated in FIG. 7, the first surface F1 may be shaped to include flat surfaces F14, F15, and F16. In the first surface F1, the flat surface F15 includes a central portion c, and is formed of a flat surface that is parallel to the support roll 101 and extends from the central portion c to an optional position a between the central portion c and each end portion e. The surface F1 also includes flat surfaces F14 and F16 in which the height increases linearly from the position a to each end portion e. The angle Θ1 formed by the flat surfaces F14 and F15 and the angle Θ2 formed by the flat surfaces F15 and F16 are in the numerical ranges described above. In this case, the first adjusting mechanism 121 can form the gap in the passage portion p so that the gap G(c) up to the position a, including the central portion c, is constant while the gap from the position a, where the gap G(c) is located, to the end portion e, where the gap G(e) is located, linearly narrows.

Furthermore, when the shape of the first surface includes two adjacent flat surfaces, although not illustrated, the first surface may have irregularities composed of a plurality of flat surfaces. In this case, the angles formed by the two adjacent flat surfaces constituting the irregularities are all 135° or more and 180° or less.

Figure 8:
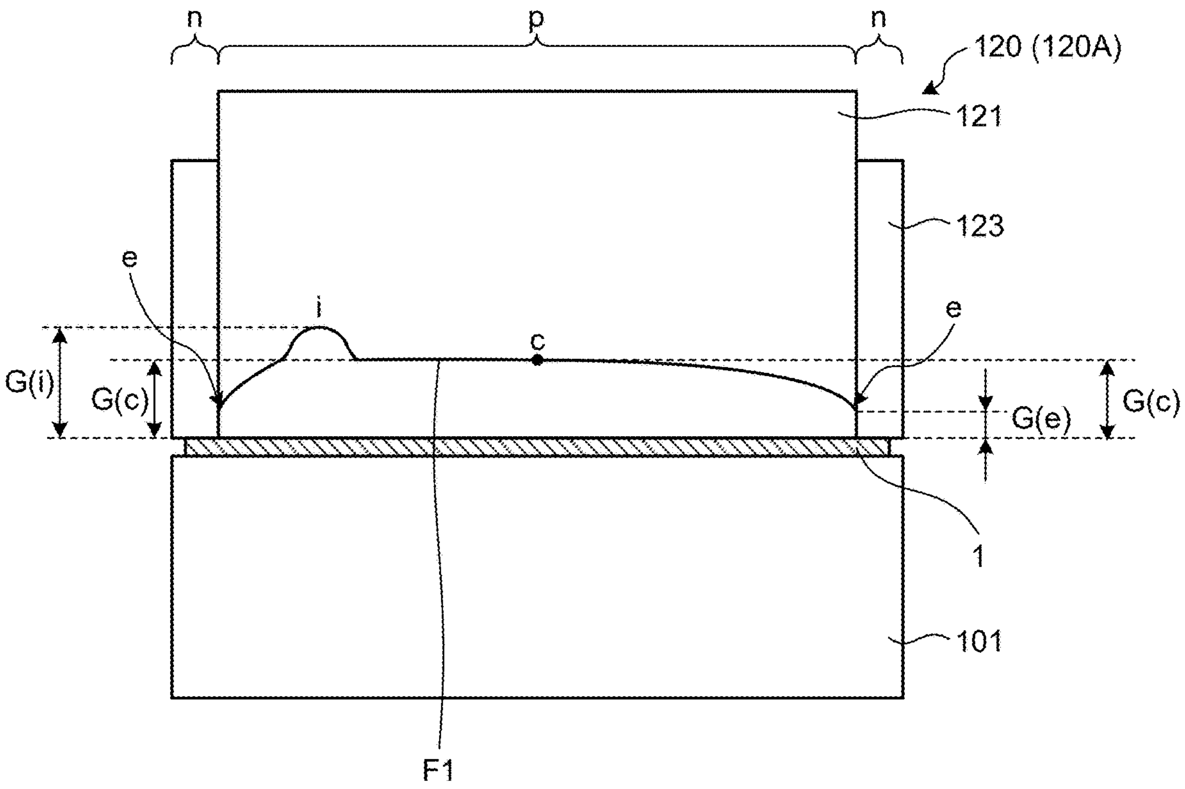
FIG. 8 is a schematic view for explaining a continuous change in the gap in the width direction of the passage portion of the squeegee unit.

Furthermore, as illustrated in FIG. 8, the first adjusting mechanism 121 can change the gap so that, for example, the gap G(i) at an optional position i between the end portion e and the central portion c of the gap is wider than the gap G(c) at the central portion c within a range that does not impair the continuous change of the gap described above. For example, in the production apparatus according to the first embodiment, when a defect such as clogging of granulated particles occurs in the gap, the gap at the corresponding portion can be widened with pinpoint accuracy to eliminate the defect.

The first adjusting mechanism 121 illustrated in FIGS. 2 and 3 is a member 121*a* having a blade shape. The first adjusting mechanism 121 includes an adjusting mechanism (A) 122 that can optionally adjust a continuous change in the gap G in the width direction of the passage portion p. FIGS. 2 and 3 illustrate an example in which the adjusting mechanism (A) 122 is a push-pull bolt.

As the push-pull bolt that can be used for the adjusting mechanism (A) 122, for example, a push-pull bolt that is used for a T-die used in an extrusion molding apparatus for a resin film can be applied. In the T-die of an extrusion molding apparatus, when adjusting a lip gap, the push-pull bolt is brought into contact with a lip portion, and the lip portion is pushed down by tightening the bolt, or the lip portion is pushed up by loosening the bolt, whereby a lip gap can be adjusted. Also in the first embodiment, the shape of the first surface F1 can be adjusted to any of the shapes illustrated in FIGS. 4 to 8 described above by bringing the push-pull bolt as the adjusting mechanism (A) 122 into contact with a portion including the first surface F1 of the first adjusting mechanism 121 (for example, the rear surface of the first surface F1) and tightening or loosening the bolt. As the adjusting mechanism (A), a T-die heat bolt may be used instead of the push-pull bolt. Therefore, the adjusting mechanism (A) is preferably one or more types selected from the group consisting of a push-pull bolt and a heat bolt.

The squeegee unit 120 can include non-passage portions n, so that a portion where the granulated particles P are not deposited on the substrate 1 may be formed in a band shape. As a result, loss of the granulated particles during the electrode production can be reduced as compared with a portion where the granulated particles are removed from the formed granulated particle layer 2 in a belt-like manner. For example, the non-passage portions may have a contact surface that comes in contact with the substrate. In addition, for example, the non-passage portions may be disposed with a gap between it and the substrate so as to be able to block the granulated particles.

As illustrated in FIGS. 2 and 3, the non-passage portions n of the squeegee unit 120A can be provided by arranging stock guides 123 as width regulating jigs at both ends of the first adjusting mechanism 121 in the width direction. Furthermore, although not illustrated, the non-passage portions of the squeegee unit may be integrally provided with the first adjusting mechanism. In the first embodiment, the stock guides 123 are preferably disposed in the non-passage portions n. This is because the stock guides 123 are plate-shaped members, and, by adjusting its thickness, the width of the non-passage portions can be adjusted. The stock guides 123 may generally be secured to the first adjusting mechanism 121 of the squeegee unit 120A using a fixing tool. The stock guides 123 can be disposed, for example, to have a contact surface that is in contact with the substrate 1 fed to the support roll 101 as a support unit.

The material constituting the stock guides 123 is not particularly limited. Examples of the material of the stock guide may include resins such as poly(tetrafluoroethylene) (PTFE), poly(acrylonitrile butadiene styrene) (ABS), polypropylene (PP), polystyrene (PS), polyethylene (PE), ultra high molecular weight polyethylene, monomer casting nylon (UMC), poly(vinyl chloride) (PVC), polyacetal, and methacrylic resin; and metals such as aluminum and stainless steel. Since the dynamic friction coefficient of the stock guide can be reduced, a stock guide 123 is preferably made of a resin, and more preferably a fluororesin such as PTFE.

At least the surface of the stock guides 123 is preferably made of a material having good slidability, such as a fluororesin. This material reduces the frictional force between the stock guides 123 and the squeegee unit 120A. Furthermore, even if the stock guides 123 come into contact with the substrate 1, the strain of the substrate 1 can be reduced, so that the breakage of the substrate 1 can be prevented. As a result, the electrode mixture layer 3 can be stably produced.

The stock guides 123 preferably have a small dynamic friction with the substrate 1. Specifically, the dynamic friction coefficient of the stock guides 123 is preferably 0.50 or less, and preferably 0.40 or less. The dynamic friction coefficient of the stock guide 123 is ideally 0, and can have a lower limit of 0.04 or more. The dynamic friction coefficient between the stock guide 123 and the substrate 1 can be measured in accordance with JIS K7125.

Furthermore, the smaller the dynamic friction coefficient of the stock guide 123 is, the more likely the adhesion between the granulated particles P and the stock guide 123 is to decrease, so that deterioration of the end portion smoothness of the electrode mixture layer due to the adhesion of the granulated particles to the stock guide 123 can be suppressed.

The stock guide 123 may also be subjected to a surface treatment to reduce the dynamic friction coefficient. Examples of such a surface treatment may include a fluororesin coating treatment, application of a lubricant, and a plating treatment.

In addition, in a case where the non-passage portions of the squeegee unit are integrally formed with the first adjusting mechanism, the portion constituting the non-passage portions may have, for example, a surface parallel with respect to the substrate and another surface adjacent to the surface and located on the passage portion side, and these surfaces have an angle of less than 135° therebetween.

The forming unit 130 includes a pair of forming rolls 107 and 108. The forming rolls 107 and 108 are cylindrical members, and are rotationally driven at a constant speed about the axes R107 and R108 in directions DR107 and DR108 in which the substrate 1 and the granulated particle layer 2 are conveyed downstream. The axes R107 and R108 are arranged to be parallel to each other. A gap is provided between the paired forming rolls 107 and 108. The granulated particle layer 2 is guided to the gap between the paired forming rolls 107 and 108. In the production apparatus 100, the stacked body of the substrate 1 and the granulated particle layer 2 is guided to the gap between the paired forming rolls 107 and 108. The granulated particle layer 2 stacked on the substrate 1, when passing through the gap between the paired forming rolls 107 and 108, is applied with a load to be in close contact with the substrate 1, and as a result, the electrode mixture layer 3 having a predetermined thickness is formed on the substrate 1. Since the granulated particle layer 2 is usually formed as the electrode mixture layer 3 by being rolled when passing through the gap between the paired forming rolls 107 and 108, the forming unit 130 can be regarded as a rolling unit.

The gap between the paired forming rolls 107 and 108 (the distance between the circumferential surfaces of the respective rolls) can be appropriately adjusted depending on the desired thickness and porosity of the electrode mixture layer, and the like.

Examples of materials constituting the circumferential surfaces of the forming rolls 107 and 108 may include rubber, metal, and inorganic materials.

The forming roll 108 may have a mechanism for heating the circumferential surface thereof. Thus, the granulated particle layer 2 can be rolled while being heated. By rolling the granulated particle layer 2 while heating, the binder contained in the granulated particles P can be softened or melted, so that the granulated particles P can be more firmly bound to one another.

The production apparatus 100 may include the pre-forming unit 140 as needed. The pre-forming unit 140 is a member that compresses the granulated particle layer 2 before the electrode mixture layer 3 is formed by applying a load to the granulated particle layer 2 in the forming unit 130. By compressing the granulated particle layer 2 in the pre-forming unit 140, the amount of air in the granulated particle layer 2 that is discharged during compression of the granulated particle layer 2 in the forming unit 130 can be reduced. Thus, it is possible to resolve the issue of deterioration in the planar shape of the electrode mixture layer when it is produced at increased production speed. The pre-forming unit 140 generally includes a main body unit 141 that compresses at least the granulated particle layer 2.

The pre-forming unit 140 is disposed between the squeegee unit 120 and the forming unit 130. Furthermore, the main body unit 141 of the pre-forming unit is arranged with a gap that allows the granulated particle layer 2 to be compressed. In FIG. 1, the main body unit 141 of the pre-forming unit 140 is arranged so as to have a predetermined gap relative to the circumferential surface of the forming roll 107. Although not illustrated, in the case where the pre-forming unit is disposed above the support unit, the pre-forming unit is disposed to have a predetermined gap relative to the support unit.

The main body unit 141 of the pre-forming unit 140 compresses the granulated particle layer 2 such that the apparent density of the granulated particle layer 2 is equal to or higher than the apparent density of the granulated particle layer 2 leveled by the squeegee unit 120 and equal to or lower than the apparent density of the electrode mixture layer 3 formed by the forming unit 130. The degree of compression of the granulated particle layer 2 is not particularly limited, and can be appropriately adjusted depending the thickness and the porosity of the electrode mixture layer, the material of the granulated particles, and the like.

The ratio (ad2/ad1) of the apparent density (ad2) of the granulated particle layer after compression by the main body unit of the pre-forming unit with respect to the apparent density (ad1) of the granulated particle layer before compression by the main body unit of the pre-forming unit is preferably 1.1 or more, more preferably 1.2 or more, and still more preferably 1.3 or more, and is preferably 2.0 or less, and more preferably 1.7 or less. Furthermore, the ratio (ad3/ad2) of the apparent density (ad3) of the electrode mixture layer with respect to the apparent density (ad2) of the granulated particle layer after compression by the main body unit of the pre-forming unit is preferably 1.1 or more, and more preferably 1.2 or more, and is preferably 2.0 or less, and more preferably 1.8 or less. When the ratio (ad2/ad1) and the ratio (ad3/ad2) fall within the above-described ranges, the amount of air in the granulated particle layer 2 that is discharged during compression of the granulated particle layer 2 in the forming unit 130 can be reduced. Thus, it is possible to resolve the issue of deterioration in the planar shape of the electrode mixture layer when it is produced at increased production speed.

The apparent density of the granulated particle layer refers to a weight per unit volume of the granulated particle layer containing voids when the granulated particle layer contains voids. In addition, the apparent density of the electrode mixture layer refers to the weight per unit volume of the electrode mixture layer containing voids when the electrode mixture layer contains voids.

Here, since the apparent density of the granulated particle layer is the weight per unit volume of the granulated particle layer, the apparent density of the granulated particle layer is determined by dividing the basis weight of the granulated particle layer by the thickness of the granulated particle layer. Similarly, since the apparent density of the electrode mixture layer is the weight per unit volume of the electrode mixture layer, the apparent density of the electrode mixture layer is determined by dividing the basis weight of the electrode mixture layer by the thickness of the electrode mixture layer.

More specifically, the apparent density (ad1) of the granulated particle layer before compression by the main body unit of the pre-forming unit is determined by dividing the basis weight of the granulated particle layer after passing through the squeegee unit by the thickness of the granulated particle layer. Furthermore, the apparent density (ad2) of the granulated particle layer after compression by the pre-forming unit is determined by dividing the basis weight of the granulated particle layer after passing through the pre-forming unit by the thickness of the granulated particle layer. Here, since the basis weight of the granulated particle layer is usually adjusted by the squeegee unit and may not change downstream of the squeegee unit, the basis weight may be the same as the basis weight of the electrode mixture layer in some cases. In this case, the apparent density of the granulated particle layer can be determined by dividing the basis weight after passing through the forming unit by the thickness of the granulated particle layer after passing through the squeegee unit or after passing through the pre-forming unit. When a contact type film thickness meter is used to measure the thickness of the granulated particle layer after the squeegee unit and pre-forming, the thickness may change due to the load from the thickness meter. Therefore, it is preferable to measure the thickness using a non-contact type film thickness meter. The non-contact type film thickness meter is not particularly limited, and examples thereof may include a laser displacement meter and the like. The basis weight of the granulated particle layer can be inspected using, for example, a basis weight inspecting unit described later.

The apparent density (ad3) of the electrode mixture layer is determined by dividing the basis weight of the electrode mixture layer after passing through the forming unit by the thickness of the electrode mixture layer. The thickness of the electrode mixture layer can be measured using either a contact or non-contact method. However, when the apparent density of the electrode mixture layer is low, and using a contact type film thickness meter would cause fluctuations in the thickness of the electrode mixture layer, it is preferable to use a non-contact film thickness meter, as is done when measuring the thickness of the granulated particle layer. The basis weight of the electrode mixture layer can be inspected using, for example, the basis weight inspecting unit described later.

The main body unit of the pre-forming unit is not limited to particular ones as long as it can compress the granulated particle layer. The form of such a main body portion is preferably, for example, a roll. This is because a load can be suitably applied to the granulated particle layer that is continuously conveyed by roll-to-roll.

The main body unit of the pre-forming unit may have a form, for example, having a second adjusting mechanism capable of continuously changing the gaps at the end portions in the width direction thereof so that the gaps are narrower than the gap at the central portion. A preferred example of such a main body portion is a roll having a second adjusting mechanism, for example. When the main body unit of the pre-forming unit is the roll having a second adjusting mechanism, for example, the granulated particle layer formed on the main surface of the substrate supported by the support roll can be compressed by rotating the roll in the same direction as the conveyance direction of the substrate (the direction DR141A in FIG. 1).

Figure 9:
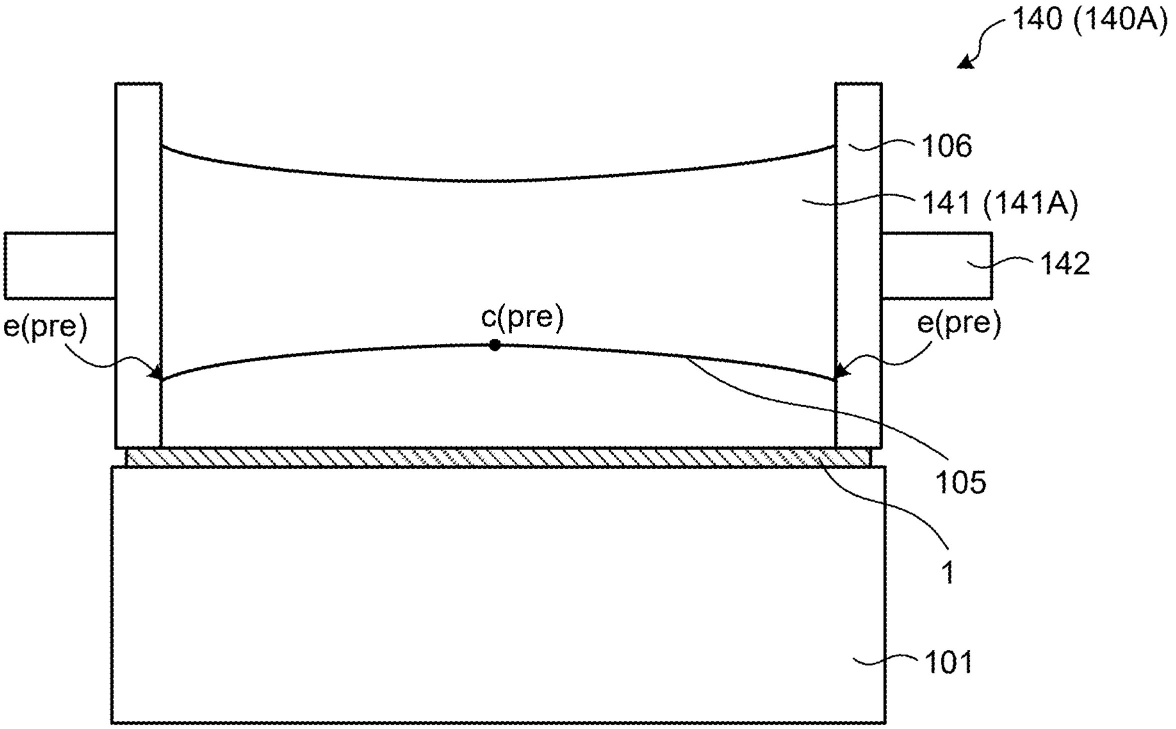
FIG. 9 is a front view schematically illustrating an example of a pre-forming unit.

A case where the main body unit of the pre-forming unit is the roll having a second adjusting mechanism will be described with reference to the drawings. FIG. 9 is a front view schematically illustrating an example of the pre-forming unit. A main body unit 141 (141A) of the pre-forming unit 140 (140A) illustrated in FIG. 9 is a roll-shaped member. Furthermore, the pre-forming unit 140A generally has a rotating shaft 142 of the main body unit 141A. The main body unit 141A has a second adjusting mechanism 105 capable of continuously changing the gaps at the end portions e (pre) so that the gaps are narrower than the gap at the central portion c (pre). Specifically, as the second adjusting mechanism 105 in the main body unit 141A, the circumferential surface of the roll has a height difference such that the gaps at the end portions e (pre) in the widthwise direction of the main body unit 141A are relatively narrow and the gap at the central portion c (pre) is relatively wide. The circumferential surface of the roll in the main body unit 141A of the pre-forming unit 140 is not limited to the shape illustrated in FIG. 9, and has, for example, any of shapes that are the shapes described in FIGS. 4 to 8 when the widthwise gap in the main body unit is observed. When the main body unit 141A includes the second adjusting mechanism 105, the circumferential surface of the roll can be adjusted by changing the diameter of the roll in the widthwise direction of the main body unit 141A.

For example, as illustrated in FIG. 9, the shape of the main body unit 141A, which is the roll including the second adjusting mechanism 105, is preferably a reverse crown roll shape in which the height of the circumferential surface increases in an arc shape from the central portion c (pre) toward each end portion e (pre) in the widthwise direction. That is, the main body unit having the second adjusting mechanism is preferably a roll having a reverse crown roll shape. The heights at the central portion and the end portions in the axial direction can also be regarded as the sizes of the diameters from the rotation axis at the central portion and the end portions. The main body unit of such a pre-forming unit is usually fixed by means of a fixture to freely rotate.

Furthermore, as another form of the main body unit of the pre-forming unit, for example, a form in which the gap in the width direction can be constant can be used. The main body unit of such a pre-forming unit may be, for example, a cylindrical roll.

The form of the main body unit of the pre-forming unit is more preferably a roll having the second adjusting mechanism among the above-described forms. Such a main body unit can suppress the flow of granulated particles in both width directions within the granulated particle layer caused by compressing the granulated particle layer 2 in the pre-forming unit 140, thereby improving the uniformity of the basis weight of the granulated particle layer.

As illustrated in FIGS. 1 and 9, the pre-forming unit 140 preferably includes sub-stock guides 106 provided at both ends of the main body unit 141 and serving as a pair of width regulating jigs for regulating the width of the granulated particle layer 2. The granulated particle layer after passing through the squeegee unit 120 has insufficient adhesion between the granulated particles, and thus, the granulated particles tend to flow easily. Therefore, when the granulated particle layer is compressed in the pre-forming unit, the granulated particles at both end portions of the granulated particle layer partially tend to flow toward the unformed portion of the electrode mixture layer on the substrate. Therefore, both end portions of the granulated particle layer are difficult to load. As a result, the adhesion between the substrate and the electrode mixture layer at both ends of the electrode mixture layer, as well as the adhesion between the granulated particles within the electrode mixture layer, are likely to be insufficient. Therefore, due to this, when the electrode with the prepared electrode mixture layer is used for battery production, the yield in the battery production process is likely to decrease. In addition, when the uniformity of the basis weight in the width direction of the electrode mixture layer according to the effect of the present invention is favorable, the above-mentioned problem becomes more pronounced. To address this problem, using width regulating jigs can prevent the flow of part of the granulated particles in the granulated particle layer at both ends toward the unformed portion of the electrode mixture layer on the substrate. This ensures that the load is firmly applied to both ends of the granulated particle layer. As a result, it is possible to suppress the decrease in the adhesion and to suppress the decrease in the yield in the battery production process caused by the decrease in the adhesion. Furthermore, when a roll having the above-described second adjusting mechanism is used in the main body unit of the pre-forming unit in addition to the width regulating jigs, it is possible to further enhance the above-described effect.

The width regulating jigs are not limited as long as they can regulate the width of the granulated particle layer, and are preferably sub-stock guides. The sub-stock guides may include the same material as that of the stock guide used for the squeegee unit described above, and may have the same physical properties. The sub-stock guides 106 illustrated in FIG. 1 have a contact surface that comes in contact with the substrate 1. The contact surfaces of the sub-stock guides 106 have a shape along the circumferential surface of the forming roll 107 via the substrate 1. The contact surface is a concave curved surface having a radius of curvature approximately equal to that of the forming roll 107, preferably 95% or more and 110% or less of the radius of curvature of the forming roll 107.

Since the pair of width regulating jigs in the pre-forming unit is usually disposed on the downstream side of the squeegee unit, the width between the paired width regulating jigs is adjusted in conformity to the width of the passage portion of the squeegee unit.

Figure 10:
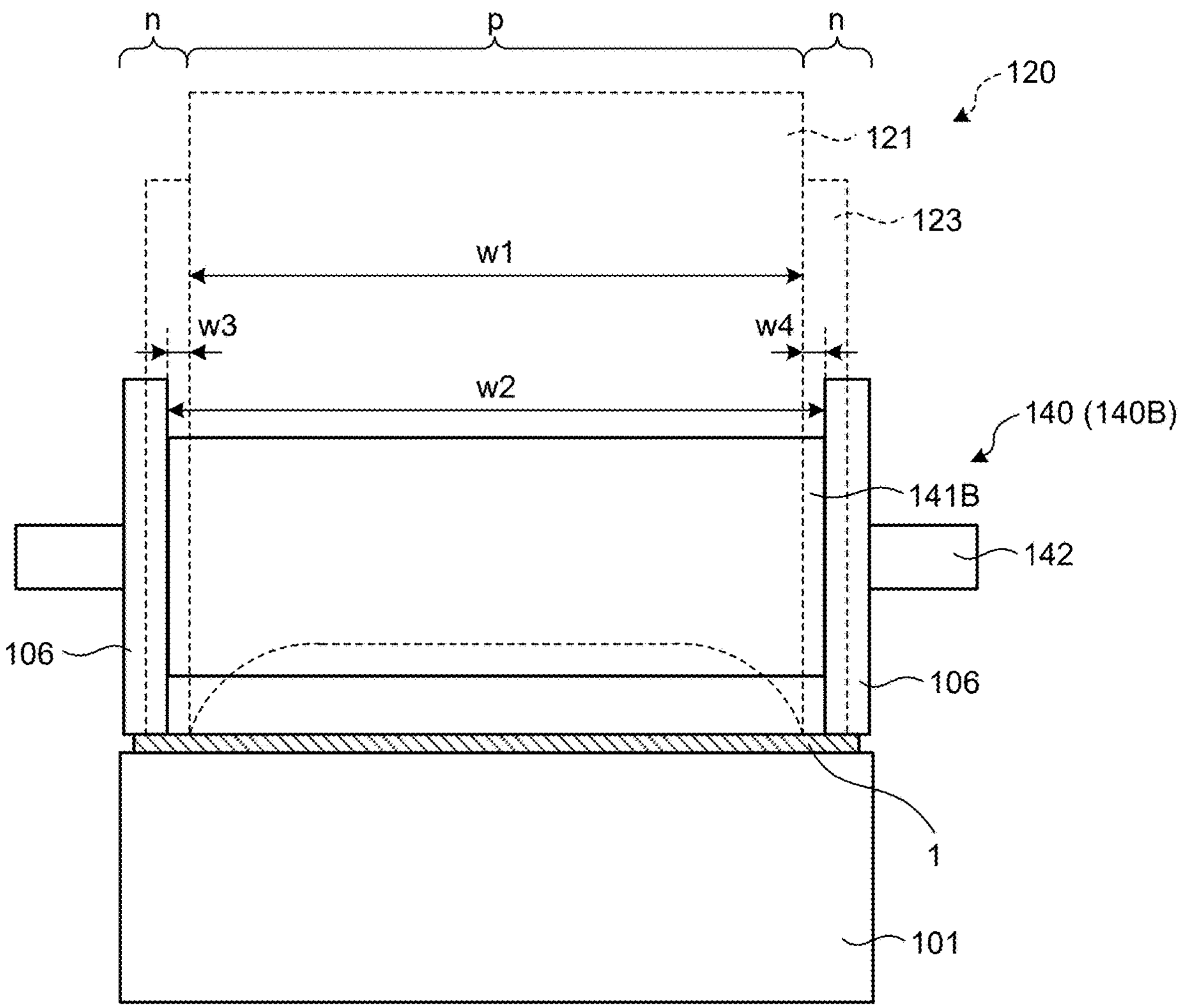
FIG. 10 is a front view schematically illustrating an example of a positional relationship in which the squeegee unit and the pre-forming unit are viewed from the front of the upstream side of the production apparatus.

FIG. 10 is a front view schematically illustrating an example of a positional relationship in which the squeegee unit and the pre-forming unit are viewed from the front of the upstream side of the production apparatus. In FIG. 10, the squeegee unit 120 is represented using a broken line. In addition, in the illustrated example, the pre-forming unit 140 (140B) has the main body unit 141B having a cylindrical roll-shape. As illustrated in FIG. 10, in the pre-forming unit 140, the width w2 between the paired width regulating jigs 106 is preferably wider than the width w1 of the passage portion p of the squeegee unit 120. More specifically, the difference (w2−w1) between the width w2 between the paired width regulating jigs 106 and the width w1 of the passage portion p of the squeegee unit 120 is preferably, for example, 0.1 mm or more, more preferably 0.3 mm or more, and still more preferably 0.5 mm or more. The width difference (w2−w1) is, for example, preferably 10 mm or less, more preferably 6 mm or less, and still more preferably 2 mm or less. When the width between the paired width regulating jigs is equal to the width of the passage portion of the squeegee unit, the granulated particle layer passing through the squeegee unit may be scraped by the width regulating jigs. On the other hand, by setting the width difference to be equal to or larger than the lower limit value, the width regulating jig is prevented from scraping or damaging the granulated particle layer due to contact with the granulated particle layer, and the size of the granulated particle layer in the width direction can be stabilized. On the other hand, by setting the width difference to be equal to or less than the upper limit value, the effect of increasing the strength at the end portions of the granulated particle layer can be exhibited highly. The difference between the width w2 between the paired width regulating jigs 106 and the width w1 of the passage portion p of the squeegee unit 120 indicates a difference between a distance in the width direction between the paired width regulating jigs 106 and a distance in the width direction of the passage portion p of the squeegee unit 120. In addition, it is preferable that the width difference (w2−w1) is equal in both width directions. The width difference (w2−w1) being equal in both width directions means that a distance of a width w3 from one width regulating jig to the passage portion in the width direction and a distance of a width w4 from the other width regulating jig to the passage portion are substantially equal to each other. Additionally, the distances of two widths being substantially equal to each other means that one width may have an error of ±5% relative to the other width, as well as a case where the two widths are strictly equal to each other.

Furthermore, as illustrated in FIG. 1, the production apparatus 100 may include the basis weight inspecting unit 150 that inspects the basis weight in the width direction of at least one of the granulated particle layer 2 and the electrode mixture layer 3, as necessary. This is because, by incorporating the basis weight inspecting unit 150, it is possible to inspect the basis weight in the width direction of the granulated particle layer 2 and the electrode mixture layer 3. If the basis weight inspecting unit 150 detects any portion where the basis weight falls outside the management value, it enables early detection of defects in these portions, allowing for prompt correction action.

Figure 11A:
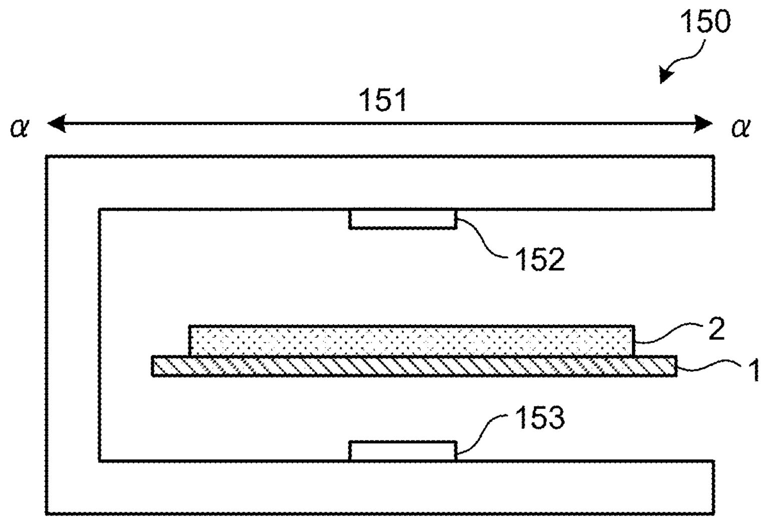
FIG. 11A includes a front view schematically illustrating an example of a basis weight inspecting unit.
Figure 11B:
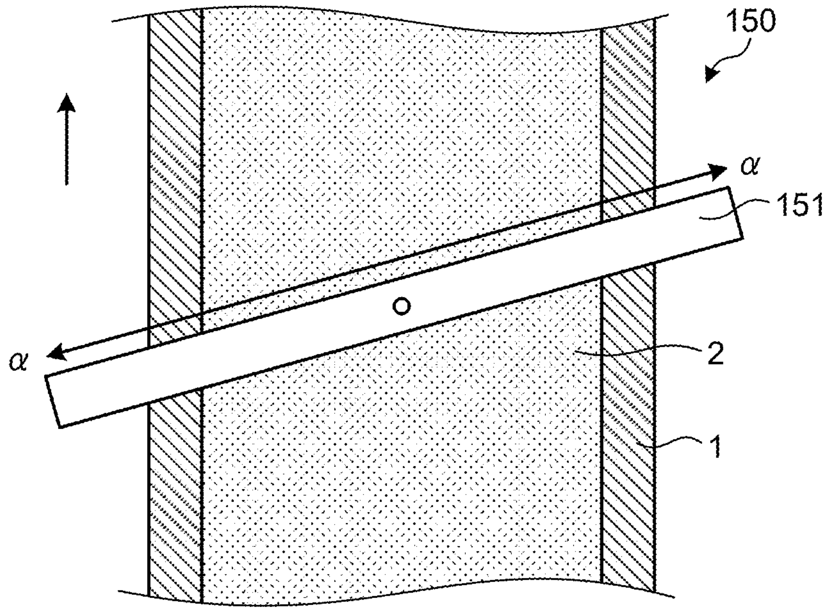
FIG. 11B includes a top view schematically illustrating an example of a basis weight inspecting unit.

FIG. 11A is a front view schematically illustrating an example of the basis weight inspecting unit, and FIG. 11B is a top view schematically illustrating a portion where the basis weight inspecting unit is disposed in the production apparatus of FIG. 1 (a top view of an α-α portion in FIG. 11A). The basis weight inspecting unit 150 includes a supporting body 151, a transmitter 152 disposed on the supporting body 151, and a detector 153 disposed on the supporting body 151 and opposed to the transmitter 152. The transmitter 152 includes, for example, a source of radiation for measurement, such as X-rays or β-rays. In the basis weight inspecting unit, for example, a stacked body of the substrate 1 and the granulated particle layer 2 or a stacked body of the substrate and the electrode mixture layer (not illustrated) is irradiated with measurement radiation from the transmitter 152, and the radiation amount transmitted through the stacked body is detected by the detector 153, whereby the basis weight can be determined on the basis of the detection amount.

In the production apparatus 100 of FIG. 1, an example is illustrated in which the basis weight inspecting unit 150 is disposed between the squeegee unit 120 and the pre-forming unit 140, but the present invention is not limited thereto. For example, the basis weight inspecting unit may be disposed between the pre-forming unit and the forming unit although not illustrated. Furthermore, for example, the basis weight inspecting unit may be disposed downstream of the forming unit.

As illustrated in FIG. 1, the production apparatus 100 may include an appearance inspecting unit 160 that inspects the appearance of the granulated particle layer 2, as necessary. This is because, by incorporating the appearance inspecting unit 160, it is possible to detect a linear defect in the granulated particle layer 2 at an early stage. If a linear defect is detected, it enables early detection of a defect in the portion, allowing for prompt correction action. As the appearance inspecting unit 160, for example, a line scan thickness monitor (in-line type) produced by Otsuka Electronics Co., Ltd. can be used. A plurality of appearance inspecting units 160 may be arranged in the width direction of the granulated particle layer as necessary.

In the production apparatus 100 of FIG. 1, an example is illustrated in which the appearance inspecting unit 160 is disposed between the squeegee unit 120 and the pre-forming unit 140, but the present invention is not limited thereto. For example, the appearance inspecting unit may be disposed between the pre-forming unit and the forming unit although not illustrated.

Although not illustrated, the production apparatus of an electrode mixture layer according to the first embodiment can be used for defect detection of the electrode mixture layer by disposing the appearance inspecting unit downstream of the forming unit, as necessary.

In addition, the production apparatus may include a coating unit that is disposed upstream of the feeding unit and that coats and dries an adhesive coating liquid on the substrate, as necessary. When the production apparatus includes the coating unit, the adhesive coating liquid is coated on the substrate and dried to form an adhesive layer, and the granulated particles can be fed onto the adhesive layer. As a result, the granulated particles can be fixed onto the substrate. Examples of the coating unit may include a slot die head, a gravure head, a bar coat head, and a knife coat head. The adhesive layer can also be regarded as an adhesive layer that bonds a current collector to the electrode mixture layer. When the substrate is used as a current collector, it is preferable to fix the electrode mixture layer to the current collector via the adhesive layer, and therefore, it is desirable that the production apparatus include a coating unit.

Furthermore, the production apparatus may include a winding unit that winds the electrode having the electrode mixture layer formed on the substrate on the downstream side of the forming unit. The winding unit may be, for example, a winding device that winds an electrode.

In addition, the production apparatus may include an unwinding unit, which feeds the substrate toward the downstream side, on the upstream side of the feeding unit. The unwinding unit may be, for example, an unwinding device that unwinds the substrate.

3. Second Embodiment

Next, a production apparatus of an electrode mixture layer according to a second embodiment will be described. FIG.

12 is a schematic view illustrating the production apparatus of an electrode mixture layer according to the second embodiment.

Figure 12:
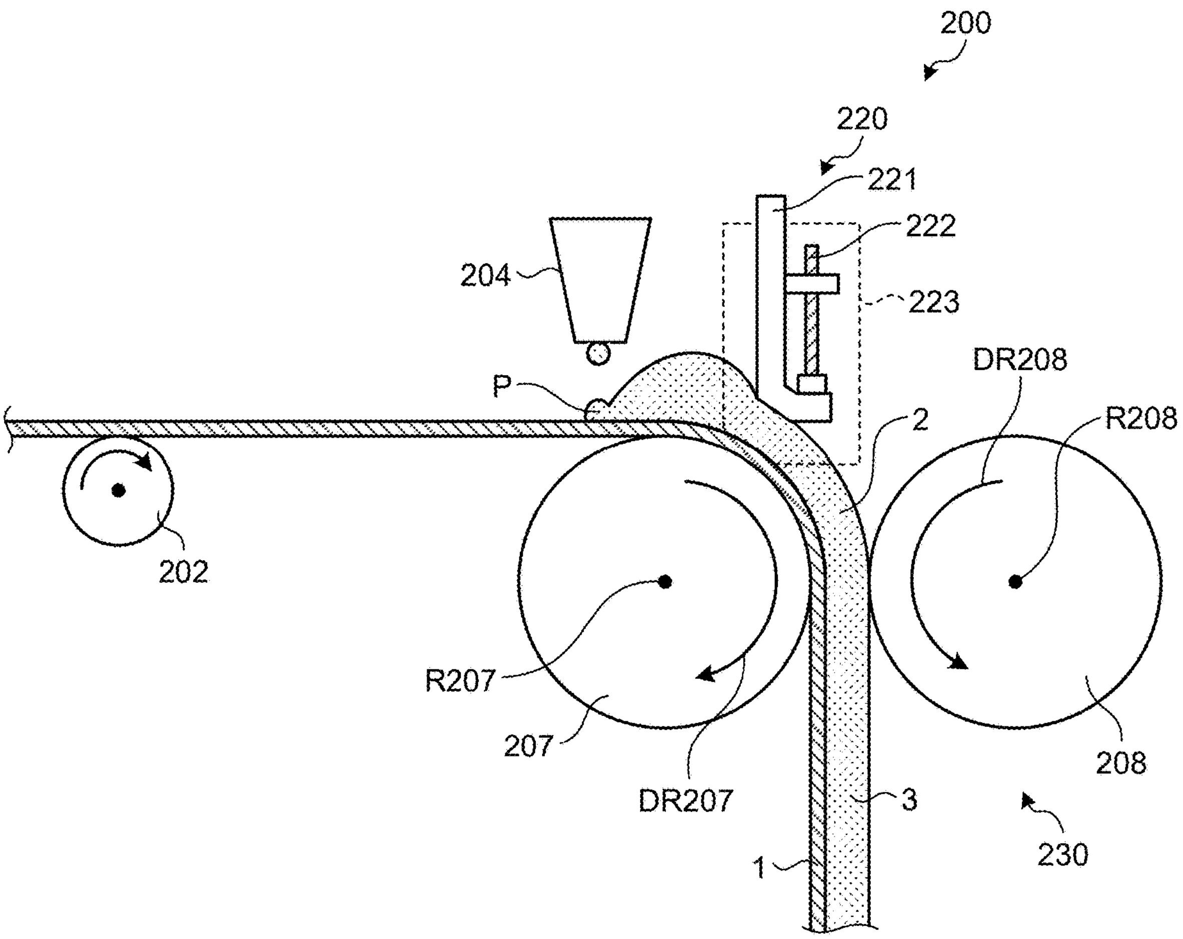
FIG. 12 is a schematic view illustrating an example of a production apparatus of an electrode mixture layer according to a second embodiment.

As illustrated in FIG. 12, the production apparatus 200 of an electrode mixture layer according to the second embodiment includes a second conveying unit 202, a feeding unit 204, a forming roll 207, a squeegee unit 220, and a forming roll 208. The forming roll 207 functions as a support unit and a first conveying unit, and the forming roll 207 and the forming roll 208 function as a forming unit 230.

In the production apparatus 200, the forming roll 207 is supported so as to be rotatable in a direction DR207 about an axis R207. The second conveying unit 202 conveys the substrate to the forming roll 207 serving as a support unit, and the forming roll 207 conveys the substrate 1 downstream while rotating in the direction DR207. In addition, the feeding unit 204 feeds the granulated particles P to the main surface of the substrate 1 that has been fed onto the forming roll serving as the support unit. The fed granulated particles P are conveyed downstream together with the substrate 1 by the forming roll 207 serving as the first conveying unit. The second conveying unit 202 and the feeding unit 204 may be configured in the same manner as the second conveying unit 102 and the feeding unit 104 according to the first embodiment.

In the production apparatus 200, the squeegee unit 220 is provided so as to have a gap relative to the forming roll 207. In FIG. 12, the squeegee unit 220 includes a first adjusting mechanism 221 provided in a passage portion and having an adjusting mechanism (A) 222, and stock guides 223 provided in non-passage portions. In FIG. 12, an example is illustrated in which the stock guides 223 each have a contact surface in contact with the substrate 1, and the contact surface has a shape along the circumferential surface of the forming roll via the substrate. The contact surface has a concave curved surface having a radius of curvature substantially the same as that of the forming roll 207. In other respects, the first adjusting mechanism 221, the adjusting mechanism (A) 222, and the stock guides 223 of the squeegee unit 220 may be the same as those described for the first adjusting mechanism 121, the adjusting mechanism (A) 122, and the stock guides 123 of the squeegee unit 120A in the first embodiment.

In the production apparatus 200, the forming unit 230 is composed of the forming roll 207 and the forming roll 208. The forming unit 230 and the forming rolls 207 and 208 (including the relationships between axes R207 and R208 and between the directions DR207 and DR208) may be configured in the same manner as those described in the forming unit 130 and the forming rolls 107 and 108 (including the relationships between the axes R107 and R108, and between the directions DR107 and DR108) according to the first embodiment.

The production apparatus of an electrode mixture layer according to the second embodiment may include, as necessary, an unwinding unit, a coating unit, a pre-forming unit, a basis weight inspecting unit, an appearance inspecting unit, and a winding unit. These configurations may be the same as those described in the first embodiment.

According to the second embodiment, since the forming roll 207 also serves as the support unit, the first conveying portion, and a part of the forming unit, the configuration of the production apparatus can be simplified.

4. Third Embodiment

Figure 13:
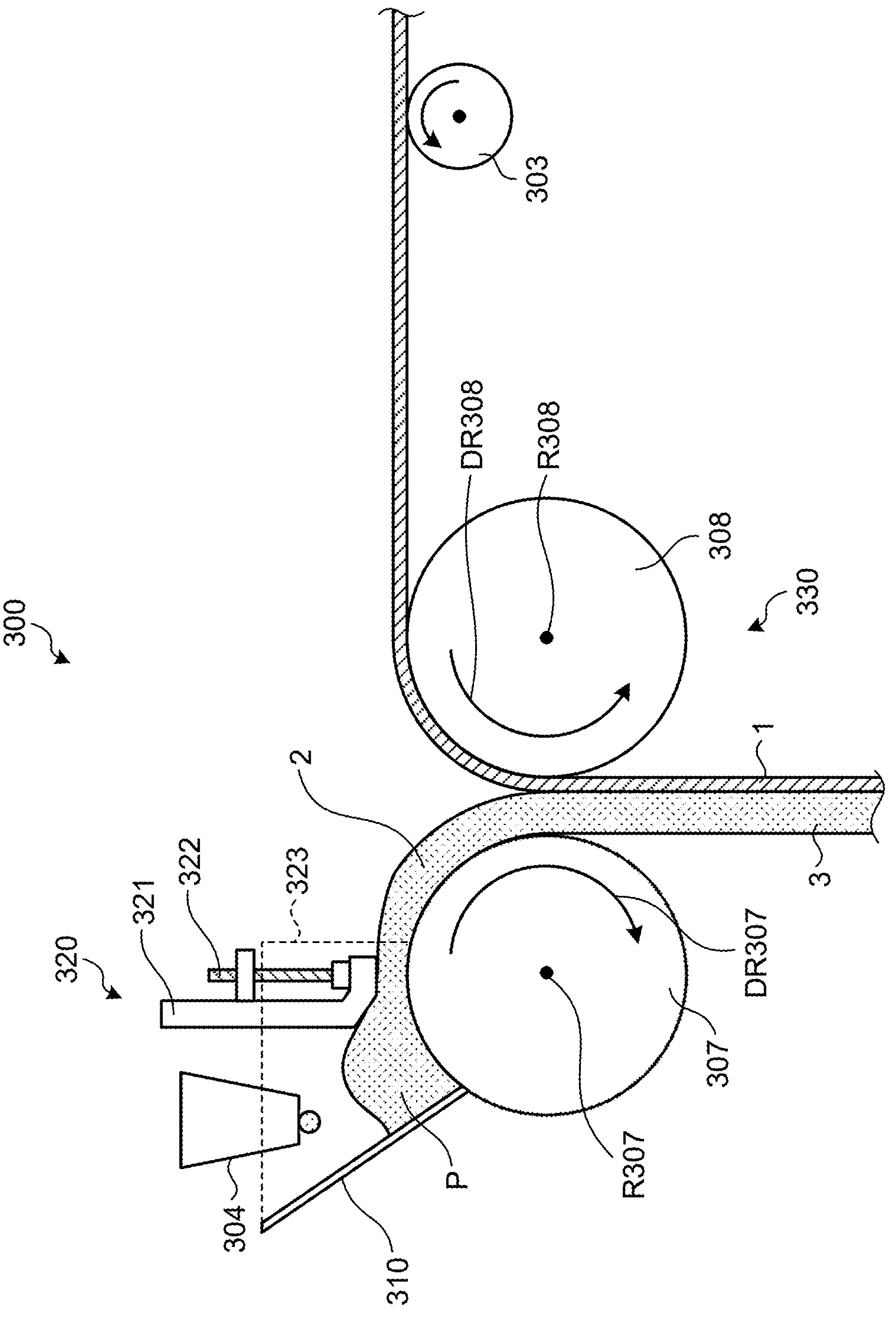
FIG. 13 is a schematic view illustrating an example of a production apparatus of an electrode mixture layer according to a third embodiment.

Next, a production apparatus of an electrode mixture layer according to a third embodiment will be described. FIG. 13 is a schematic view illustrating the production apparatus of an electrode mixture layer according to the third embodiment.

As illustrated in FIG. 13, the production apparatus 300 of an electrode mixture layer according to the third embodiment includes a forming roll 307, a dam plate 310, a feeding unit 304, a squeegee unit 320, a forming roll 308, and a third conveying unit 303. The forming roll 307 functions as a support unit and a first conveying unit, and the forming roll 307 and the forming roll 308 function as a forming unit 330.

In the production apparatus 300, the granulated particles P are directly fed from the feeding unit 304, which is disposed above the forming roll 307, onto the circumferential surface of the forming roll 307, and the forming roll 307 rotates in a direction DR307 about an axis R307 to convey the granulated particles P downstream. The feeding unit 304 may be configured in the same manner as the feeding unit 104 according to the first embodiment. In addition, in the production apparatus 300, in order to prevent the granulated particles P from flowing down below the forming roll 307 (in an opposite direction to the rotational direction DR307 of the forming roll 307), the dam plate 310 is disposed below the feeding unit 304 at a position where it is contact with the forming roll 307.

Furthermore, the squeegee unit 320 forms the granulated particle layer 2 by leveling the granulated particles P conveyed by the forming roll 307 using a first adjusting mechanism 321 having an adjusting mechanism (A) 322. The squeegee unit 320 may be configured in the same manner as the squeegee unit 220 described in the second embodiment except that stock guides 323 are disposed at both ends in the width direction of the dam plate 310 and the first adjusting mechanism 321, and have a contact surface that is in contact with the forming roll 307 and that has a shape along a circumferential surface thereof.

In the production apparatus 300, the forming unit 330 is composed of the forming roll 307 and the forming roll 308. In the third embodiment, the substrate 1 is fed from the third conveying unit 303 towards the forming roll 308, and the granulated particle layer 2 is rolled in the gap between the forming roll 307 and the forming roll 308 to form the electrode mixture layer 3. At this time, the electrode mixture layer 3 is transferred onto the main surface of the substrate 1 and brought into close contact therewith, whereby a stacked body of the substrate 1 and the electrode mixture layer 3 is formed as an electrode sheet. The forming unit 330 and the forming rolls 307 and 308 (including the relationships between axes R307 and R308, and between the directions DR307 and DR308) may be configured in the same manner as those described in the forming unit 130 and the forming rolls 107 and 108 (including the relationships between the axes R107 and R108, and between the directions DR107 and DR108) according to the first embodiment.

The production apparatus of an electrode mixture layer according to the third embodiment may include, as necessary, an unwinding unit, a coating unit, a pre-forming unit, a basis weight inspecting unit, an appearance inspecting unit, and a winding unit. In the third embodiment, the coating unit may generally be disposed between the third conveying unit and the forming unit. These configurations may be the same as those described in the first embodiment.

According to the third embodiment, since the electrode mixture layer can be formed on and transferred to the substrate within the forming unit, the burden on the substrate during the production of the electrode mixture layer can be reduced.

5. Fourth Embodiment

Next, a production apparatus of an electrode mixture layer according to a fourth embodiment will be described.

Figure 14:
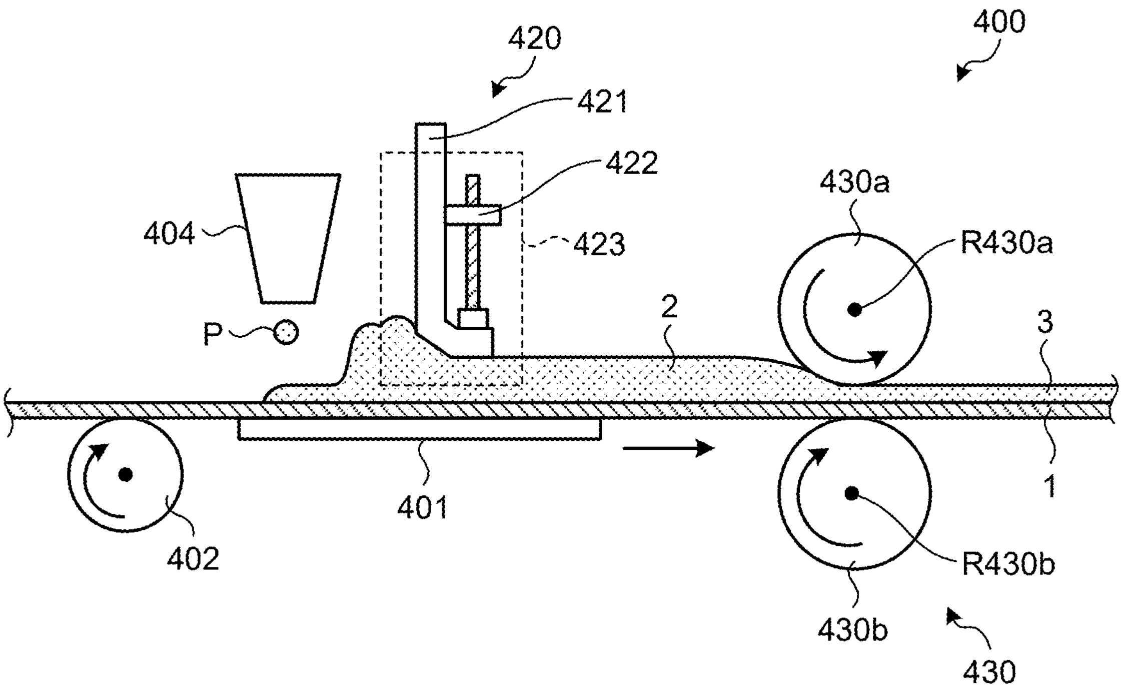
FIG. 14 is a schematic view illustrating an example of a production apparatus of an electrode mixture layer according to a fourth embodiment.

FIG. 14 is a schematic view illustrating an example of the production apparatus of an electrode mixture layer according to a fourth embodiment.

As illustrated in FIG. 14, the production apparatus 400 according to the fourth embodiment includes a second conveying unit 402, a support unit 401, a feeding unit 404, a squeegee unit 420, and a pair of forming rolls 430*a* and 430*b* that serve as a first conveying unit and a forming unit 430.

The support unit 401 has a plate shape. The feeding unit 404 feeds the granulated particles P onto the main surface of the substrate 1 supported by the support unit 401, from above the support unit 401. That is, the surface to which the granulated particles P are fed is the main surface of the substrate 1. The forming rolls 430*a* and 430*b* that serves as the first conveying unit rotate in opposite directions to convey the substrate and also the granulated particles P fed onto the main surface of the substrate 1. The squeegee unit 420 is disposed with a gap above the support unit 401, and forms the granulated particle layer 2 by leveling the granulated particles P using a first adjusting mechanism 421 having an adjusting mechanism (A) 422. The feeding unit 404 and the pair of forming rolls 430*a* and 430*b* in the forming unit 430 may be configured in the same manner as those described in the feeding unit 104 and the pair of forming rolls 107 and 108 in the forming unit 130 according to the first embodiment except for the points described above. In addition, the squeegee unit 420 according to the fourth embodiment and the respective configurations thereof can be configured in the same manner as the squeegee unit 120A according to the first embodiment and the respective configurations thereof, except that stock guides 423 are disposed with a gap relative to the substrate 1 that prevents the granulated particles P from passing therethrough.

The production apparatus of an electrode mixture layer according to the fourth embodiment may include, as necessary, an unwinding unit, a coating unit, a pre-forming unit, a basis weight inspecting unit, an appearance inspecting unit, and a winding unit. These configurations may be the same as those described in the first embodiment.

6. Production Method of Electrode Mixture Layer

A production method of an electrode mixture layer according to an embodiment of the present invention is a production method that uses the above-described production apparatus of an electrode mixture layer, and that includes the following steps (1) and (2) in this order.

(1) A step of conveying granulated particles, which have been fed from the feeding unit onto or above the support unit, by the conveying unit and leveling the conveyed granulated particles using the squeegee unit to form a granulated particle layer.

(2) A step of applying a load to the granulated particle layer using the forming unit to form the electrode mixture layer.

According to the present invention, by performing the steps (1) and (2) using the production apparatus described above, the electrode mixture layer having favorable uniformity of the basis weight of the granulated particles can be produced while suppressing the excessive basis weight of the granulated particles at each end portion in the width direction of the electrode mixture layer at the time of producing the electrode mixture layer.

When the production apparatus includes the basis weight inspecting unit, for example, the production method according to an embodiment of the present invention preferably includes the following step (3) in addition to the above-mentioned steps (1) and (2).

(3) A step of inspecting a basis weight in the width direction of at least one of the granulated particle layer and the electrode mixture layer using the basis weight inspecting unit, and, when a portion where the basis weight in the width direction falls outside the management value is detected, adjusting the gap in the width direction of the squeegee unit corresponding to the portion.

By including the step (3) in the production process, the gap in the width direction of the squeegee unit is adjusted for portions where the basis weight in the width direction falls outside the management value either being too large or too small. As a result, it becomes possible to eliminate the defect, or minimize the portion where the basis weight in the width direction falls outside the management value and that needs to be discarded.

As a method of adjusting the gap in the width direction of the squeegee unit corresponding to a portion where the basis weight falls outside the management value, for example, there is mentioned a method of adjusting the width of the entire gap in the width direction including the portion by changing the relative position of the entire squeegee unit with respect to the support unit. In addition, when the squeegee unit includes the first adjusting mechanism having the adjusting mechanism (A), the portion or the width of the gap at the portion and therearound can be adjusted with pinpoint accuracy.

Furthermore, when the production apparatus includes the appearance inspecting unit, for example, the production method according to an embodiment of the present invention preferably includes the following step (4) between the steps (1) and (2).

(4) A step of inspecting an appearance of the granulated particle layer using the appearance inspection unit, and when a portion where a linear defect occurs in the granulated particle layer is detected, temporarily widening the gap in the width direction of the squeegee unit corresponding to the portion to eliminate the linear defect.

One of the factors of the linear defect in the granulated particle layer may include the adhesion of granulated particles to the squeegee unit corresponding to the portion where the linear defect has occurred, and clogging (catching) of the granulated particles in the gap corresponding to the portion. According to an embodiment of the present invention, by including the step (4), the gap in the width direction of the squeegee unit is temporarily widened corresponding to the portion where the linear defect has occurred in the granulated particle layer. This makes it possible to eliminate linear defects caused by issues, such as adhesion and clogging of the granulated particles. Furthermore, by including the step (4), it is possible to detect and eliminate the occurrence portion of the linear defect at an early stage, thereby reducing any defects in the electrode mixture layer.

7. Modification

In the above-mentioned description, an example where the production apparatus of an electrode mixture layer includes the support unit, the feeding unit, the conveying unit, the squeegee unit, and the forming unit has been described. The present invention can provide a production apparatus including the following configuration, as the production apparatus of an electrode mixture layer of the modification.

A production apparatus of an electrode mixture layer includes: a support unit; a feeding unit that feeds granulated particles on or above the support unit, the granulated particles containing an active material and a binder; a conveying unit that conveys the granulated particles that have been fed on or above the support unit; a squeegee unit that levels the conveyed granulated particles to form a granulated particle layer, the squeegee unit including a passage portion that is provided so as to have a gap relative to the support unit and allows the granulated particles to pass therethrough, and non-passage portions that are provided at both ends of the passage portion and block the passage of the granulated particles; a forming unit that applies a load to the granulated particle layer to form an electrode mixture layer; and a pre-forming unit disposed between the squeegee unit and the forming unit, the pre-forming unit including a main body unit that compresses the granulated particle layer such that an apparent density of the granulated particle layer is equal to or higher than an apparent density of the granulated particle layer leveled by the squeegee unit and equal to or lower than an apparent density of the electrode mixture layer formed by the forming unit and a pair of width regulating jigs that are disposed at both ends of the main body unit and that regulates the width of the granulated particle layer. In the production apparatus, the main body unit of the pre-forming unit is arranged with a gap that allows the granulated particle layer to be compressed.

In a conventional production apparatus of an electrode mixture layer, when the granulated particle layer is rolled in the forming unit, the granulated particles may flow or be blown away by air contained in the granulated particle layer, which has been applied by the squeegee unit, whereby a favorable planar shape may not be obtained in some cases. In particular, when the electrode mixture layer is produced at increased production speed, the above-mentioned phenomenon tends to occur. Furthermore, since the granulated particles tend to flow, in particular, the granulated particles may flow at end portions of the granulated particle layer.

On the other hand, according to the modification, the production apparatus having the pre-forming unit can reduce the amount of air that is discharged during compression of the granulated particle layer in the forming unit. As a result, it is possible to resolve the issue of deterioration in the planar shape of the electrode mixture layer when the electrode mixture layer is produced at increased production speed. Furthermore, the pre-forming unit having the pair of width regulating jigs can suppress the flow of the granulated particles at both end portions of the granulated particle layer. As a result, it is possible to favorably apply a load to the entire granulated particle layer including both end portions using the main body unit of the pre-forming unit, and therefore, even when the granulated particle layer is compressed in the subsequent forming unit, it is possible to favorably apply a load to the entire granulated particle layer including both end portions, and this makes it possible to improve the adhesion between the substrate and the granulated particle layer. Therefore, the yield of battery production can be improved.

The production apparatus of the modification includes at least the support unit, the feeding unit, the conveying unit, the squeegee unit, the pre-forming unit, and the forming unit. Furthermore, the production apparatus may include, as optional configurations, a basis weight inspecting unit and an appearance inspecting unit. As an example of such a production apparatus, there is a production apparatus where the production apparatus 100 illustrated in FIG. 1 includes a squeegee unit, which is not limited to the squeegee unit 120. However, the example is not limited to this.

The form of the main body unit of the pre-forming unit and the pair of width regulating jigs in the modification may be configured in the same manner as those described in the production apparatus of the first embodiment.

In the modification, the form of the squeegee unit is not particularly limited, and as a preferable example, the form of the squeegee unit in the first embodiment is exemplified. The respective configurations of the production apparatus other than the squeegee unit may be the same as those described for the respective configurations of the production apparatuses according to the first to fourth embodiments.

Furthermore, in the present invention, as a production method of an electrode mixture layer using the production apparatus of the modification described above, a production method that includes the following steps (5) to (7) in this order, can be provided.

(5) A step of conveying the granulated particles, which have been fed from the feeding unit on or above the support unit, by the conveying unit and leveling the conveyed granulated particles using the squeegee unit to form a granulated particle layer.

(6) A step of compressing the granulated particle layer using the pre-forming unit.

(7) A step of applying a load to the granulated particle layer using the forming unit to form the electrode mixture layer.

By performing the steps (5) to (7) using the production apparatus of the modification, it is possible to produce an electrode mixture layer having a favorable planar shape and favorable adhesion between the substrate and the granulated particle layer.

REFERENCE SIGN LIST

1: substrate
2: granulated particle layer
3: electrode active material layer
P: granulated particles
100, 100A, 100B: production apparatus
101: forming roll (support unit and first conveying unit)
102: second conveying unit
104: feeding unit
105: second adjusting mechanism
106: sub-stock guide
107, 108: forming roll
120, 120A: squeegee unit
121, 124: first adjusting mechanism
122: adjusting mechanism (A)
123: stock guide
p: passage portion
n: non-passage portion
c: central portion
e: end portion
G: gap
130: forming unit
140: pre-forming unit
141, 141A, 141B: main body unit
150: basis weight inspecting unit
160: appearance inspecting unit

The invention claimed is:

1. A production apparatus of an electrode mixture layer, comprising:

a support unit;

a feeding unit that feeds granulated particles on or above the support unit, the granulated particles containing an active material and a binder;

a conveying unit that conveys the granulated particles that have been fed on or above the support unit;

a squeegee unit that levels the conveyed granulated particles to form a granulated particle layer, the squeegee unit including a passage portion that is provided so as to have a gap relative to the support unit and allows the granulated particles to pass therethrough, and non-passage portions that are provided at both ends of the passage portion and block the passage of the granulated particles; and a forming unit that applies a load to the granulated particle layer to form an electrode mixture layer, wherein the squeegee unit has a first adjusting mechanism capable of continuously changing a gap in a width direction so that gaps at end portions in the width direction of the passage portion are narrower than a gap at a central portion.

2. The production apparatus of an electrode mixture layer according to claim 1, comprising a pre-forming unit disposed between the squeegee unit and the forming unit, wherein:

the pre-forming unit includes a main body unit that compresses the granulated particle layer such that an apparent density of the granulated particle layer is equal to or higher than an apparent density of the granulated particle layer leveled by the squeegee unit and equal to or lower than an apparent density of the electrode mixture layer formed by the forming unit, wherein the apparent density of the granulated particle layer is a value determined by dividing a basis weight of the granulated particle layer by a thickness of the granulated particle layer, and the apparent density of the electrode mixture layer is a value determined by dividing a basis weight of the electrode mixture layer by a thickness of the electrode mixture layer;

the main body unit of the pre-forming unit is arranged with a gap that allows the granulated particle layer to be compressed; and the pre-forming unit includes a pair of width regulating jigs that are disposed at both ends of the main body unit and that regulates a width of the granulated particle layer.

3. The production apparatus of an electrode mixture layer according to claim 2, wherein a width between the pair of width regulating jigs is wider than a width of the passage portion of the squeegee unit.

4. The production apparatus of an electrode mixture layer according to claim 1, comprising a pre-forming unit disposed between the squeegee unit and the forming unit, wherein:

the pre-forming unit includes a main body unit that compresses the granulated particle layer such that an apparent density of the granulated particle layer is equal to or higher than an apparent density of the granulated particle layer leveled by the squeegee unit and equal to or lower than an apparent density of the electrode mixture layer formed by the forming unit, wherein the apparent density of the granulated particle layer is a value determined by dividing a basis weight of the granulated particle layer by a thickness of the granulated particle layer, and the apparent density of the electrode mixture layer is a value determined by dividing a basis weight of the electrode mixture layer by a thickness of the electrode mixture layer;

the main body unit of the pre-forming unit is arranged with a gap that allows the granulated particle layer to be compressed; and the main body unit of the pre-forming unit includes a second adjusting mechanism capable of continuously changing gaps in the width direction of the pre-forming unit so that gaps at end portions in the width direction thereof are narrower than a gap at a central portion.

5. The production apparatus of an electrode mixture layer according to claim 4, wherein the main body unit including the second adjusting mechanism is a reverse crown roll.

6. The production apparatus of an electrode mixture layer according to claim 1, comprising a pre-forming unit disposed between the squeegee unit and the forming unit, wherein:

the pre-forming unit includes a main body unit that compresses the granulated particle layer such that an apparent density of the granulated particle layer is equal to or higher than an apparent density of the granulated particle layer leveled by the squeegee unit and equal to or lower than an apparent density of the electrode mixture layer formed by the forming unit, wherein the apparent density of the granulated particle layer is a value determined by dividing a basis weight of the granulated particle layer by a thickness of the granulated particle layer, and the apparent density of the electrode mixture layer is a value determined by dividing a basis weight of the electrode mixture layer by a thickness of the electrode mixture layer;

the main body unit of the pre-forming unit is arranged with a gap that allows the granulated particle layer to be compressed, and the main body unit of the pre-forming unit includes a second adjusting mechanism capable of continuously changing gaps in the width direction of the pre-forming unit so that gaps at end portions in the width direction thereof are narrower than a gap at a central portion; and the pre-forming unit includes a pair of width regulating jigs that are disposed at both ends of the main body unit and that regulates the width of the granulated particle layer.

7. The production apparatus of an electrode mixture layer according to claim 5, wherein a width between the pair of width regulating jigs is wider than a width of the passage portion of the squeegee unit.

8. The production apparatus of an electrode mixture layer according to claim 1, wherein the first adjusting mechanism has a blade and has a first surface that faces a surface of the support unit, and the first adjusting mechanism includes an adjusting mechanism (A) that can optionally adjust a continuous change in the gap in the width direction of the passage portion by adjusting a shape of the first surface.

9. The production apparatus of an electrode mixture layer according to claim 8, wherein the adjusting mechanism (A) is one or more selected from the group consisting of a push-pull bolt and a heat bolt.

10. The production apparatus of an electrode mixture layer according to claim 1, comprising a basis weight inspecting unit that inspects a basis weight in the width direction of at least one of the granulated particle layer and the electrode mixture layer by irradiating and detecting radiation for measurement.

11. The production apparatus of an electrode mixture layer according to claim 1, comprising an appearance inspecting unit that inspects an appearance of the granulated particle layer to detect a linear defect using an in-line line thickness monitor.

* * * * *